US010915818B1

(12) United States Patent
Patel et al.

(10) Patent No.: US 10,915,818 B1
(45) Date of Patent: Feb. 9, 2021

(54) LATENT SPACE METHOD OF GENERATING FOOD FORMULAS

(71) Applicant: NOTCO DELAWARE, LLC, Santiago (CL)

(72) Inventors: Aadit Patel, Santiago (CL); Ofer Philip Korsunsky, Santiago (CL); Karim Pichara, Santiago (CL); Yoav Navon, Santiago (CL); Richard Hausman, Santiago (CL)

(73) Assignee: NOTCO DELAWARE, LLC, Santiago (CL)

( * ) Notice: Subject to any disclaimer, the term of this patent is extended or adjusted under 35 U.S.C. 154(b) by 0 days.

(21) Appl. No.: 16/924,006

(22) Filed: Jul. 8, 2020

(51) Int. Cl.
*G06N 3/08* (2006.01)
*G06N 3/04* (2006.01)

(52) U.S. Cl.
CPC ........... *G06N 3/088* (2013.01); *G06N 3/0445* (2013.01); *G06N 3/0454* (2013.01)

(58) Field of Classification Search
CPC ..... G06N 3/0445; G06N 3/0454; G06N 3/088
See application file for complete search history.

(56) References Cited

U.S. PATENT DOCUMENTS

2017/0116517 A1* 4/2017 Chee ...................... G05B 15/02
2017/0139902 A1* 5/2017 Byron .................. G06Q 10/087
2018/0192680 A1 7/2018 Fraser
2019/0171707 A1* 6/2019 Rapaport .............. G06F 3/0482
2019/0228855 A1* 7/2019 Leifer .................. G06N 3/0454
2019/0228856 A1* 7/2019 Leifer .................... G16H 20/60

FOREIGN PATENT DOCUMENTS

WO WO2020/237214 11/2020

OTHER PUBLICATIONS

Bowman et al., Generating Sentences from a Continuous Space, May 2016. (Year: 2016).*
Rudinger et al., Skip-Prop: Representing Sentences with One Vector Per Proposition, 12th International Conference on Computational Semantics, 2017. (Year: 2017).*
Karamanolakis et al., Item Recommendation with Variational Autoencoders and Heterogeneous Priors, DLRS, Oct. 2018. (Year: 2018).*
Pichara, U.S. Appl. No. 16/416,095, filed May 17, 2019, Office Action, dated Jul. 29, 2019.
Pichara, U.S. Appl. No. 16/416,095, filed May 17, 2019, Final Office Action, dated Dec. 16, 2019.

(Continued)

*Primary Examiner* — Kamran Afshar
*Assistant Examiner* — Marshall L Werner
(74) *Attorney, Agent, or Firm* — Hickman Palermo Becker Bingham LLP

(57) ABSTRACT

Techniques to mimic a target food item using artificial intelligence are disclosed. A formula generator learns from open source and proprietary databases of ingredients and recipes. The formula generator is trained using features of the ingredients and using recipes. Given a target food item, the formula generator determines a formula that matches the given target food item and a score for the formula. The formula generator may generate numerous formulas that match the given target food item and may select an optimal formula from the generated formulas based on score.

20 Claims, 16 Drawing Sheets

100

Client Device 104
Network 102
Formula Generator 114
116 Representation Model
118 Prediction Model
120 Quantity Solver
122 Formula Searcher
124 Optimizer
Data Repository 106
108 Ingredients Database
110 Recipes Database
112 Flavor Database

(56) References Cited

OTHER PUBLICATIONS

The International Searching Authority, "Search Report" in application No. PCT/US2020/034385, dated Jul. 20, 2020, 7 pages.
Current Claims in application No. PCT/US2020/034385, dated Jul. 2020, 5 pages.
The International Searching Authority, "Search Report" in application No. PCT/US2020/043330, dated Sep. 18, 2020, 16 pages.
Rudinger et al., Skip-Prop: Representing Sentences with One Vector Pre Proposition, 12th International Conference on Computational Semantics, dated 2017, 7 pages.
Kramanolakis et al., "Item Recommendation with Variational Autoencoders and Heterogeneous Priors", DLRS, dated Oct. 2018, 5 pages.
Current Claims in application No. PCT/US2020/043330, dated Sep. 2020, 5 pages.
Bowman et al., "Generating Sentences from a Continuous Space", dated May 2016, 12 pages.
Pichara, U.S. Appl. No. 16/406,095, filed May 17, 2019, Office Action, dated Nov. 4, 2020.
Navon, U.S. Appl. No. 16/989,413, filed Aug. 10, 2020, Office Action, dated Sep. 30, 2020.

* cited by examiner $$\operatorname{argmax}\begin{bmatrix} \text{------} & z_{pinapple} & \text{------} \\ \text{------} & z_{chicken} & \text{------} \\ \text{------} & z_{corn} & \text{------} \\ \text{------} & z_{tuna} & \text{------} \end{bmatrix}\begin{bmatrix} h_1 \end{bmatrix}$$

$$\operatorname{argmax}\begin{bmatrix} \text{------} & z_{pinapple} & \text{------} \\ \text{------} & 0 & \text{------} \\ \text{------} & z_{corn} & \text{------} \\ \text{------} & 0 & \text{------} \end{bmatrix}\begin{bmatrix} h_1 \end{bmatrix}$$

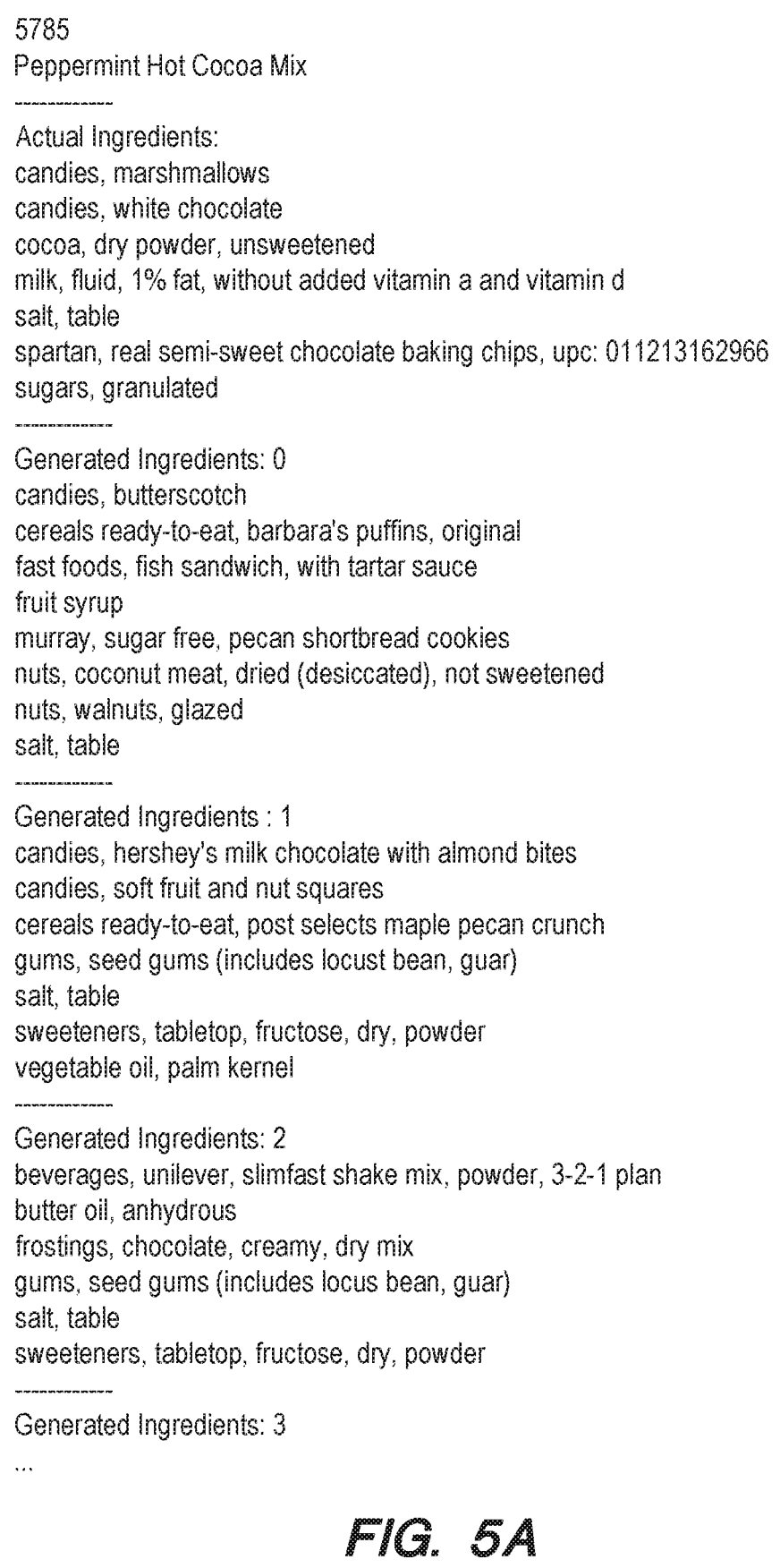

5785
Peppermint Hot Cocoa Mix
-------------
Actual Ingredients:
candies, marshmallows
candies, white chocolate
cocoa, dry powder, unsweetened
milk, fluid, 1% fat, without added vitamin a and vitamin d
salt, table
spartan, real semi-sweet chocolate baking chips, upc: 011213162966
sugars, granulated
-------------
Generated Ingredients: 0
candies, butterscotch
cereals ready-to-eat, barbara's puffins, original
fast foods, fish sandwich, with tartar sauce
fruit syrup
murray, sugar free, pecan shortbread cookies
nuts, coconut meat, dried (desiccated), not sweetened
nuts, walnuts, glazed
salt, table
-------------
Generated Ingredients : 1
candies, hershey's milk chocolate with almond bites
candies, soft fruit and nut squares
cereals ready-to-eat, post selects maple pecan crunch
gums, seed gums (includes locust bean, guar)
salt, table
sweeteners, tabletop, fructose, dry, powder
vegetable oil, palm kernel
-------------
Generated Ingredients: 2
beverages, unilever, slimfast shake mix, powder, 3-2-1 plan
butter oil, anhydrous
frostings, chocolate, creamy, dry mix
gums, seed gums (includes locus bean, guar)
salt, table
sweeteners, tabletop, fructose, dry, powder
-------------
Generated Ingredients: 3
...

*FIG. 5A*

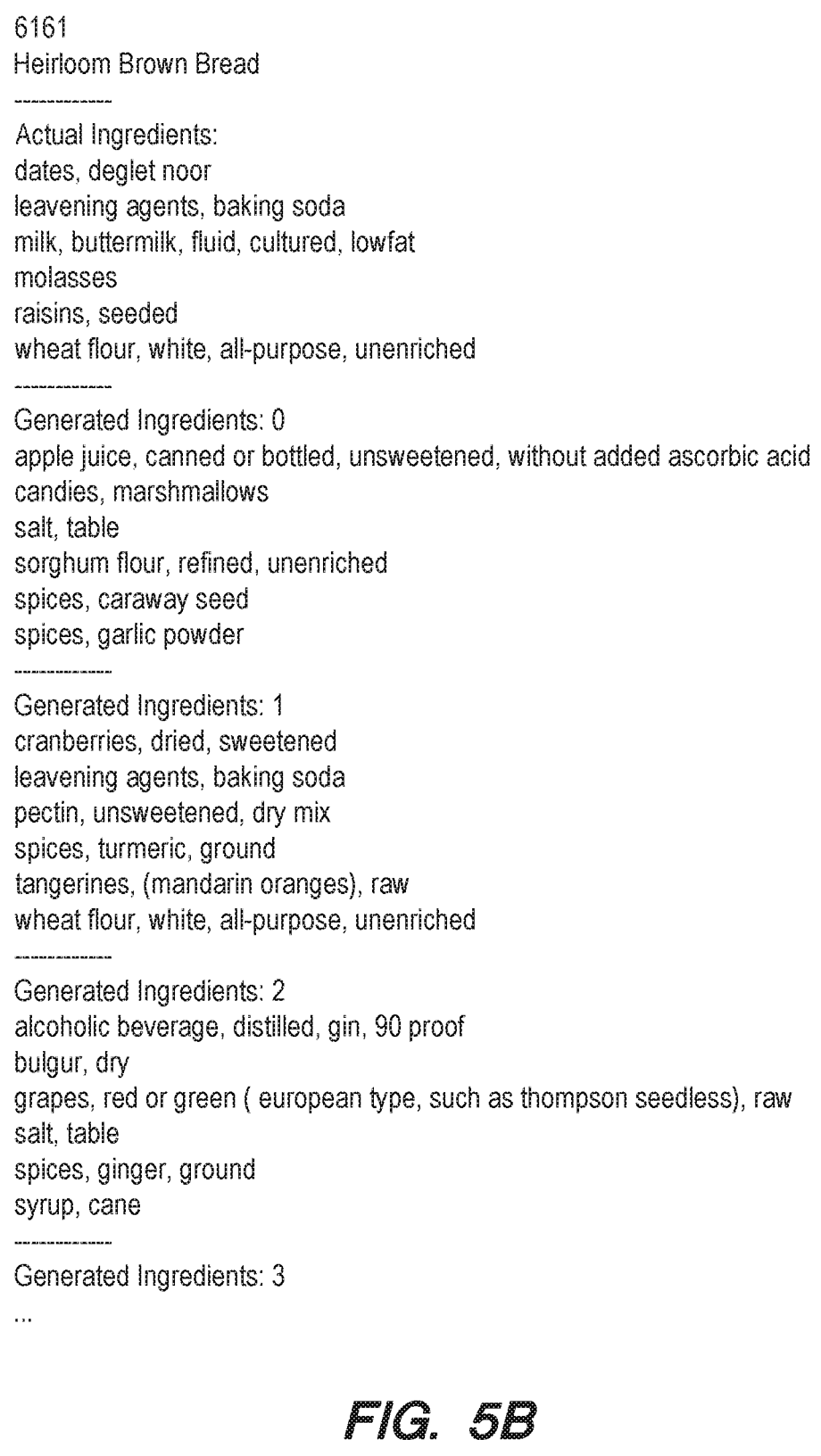

6161
Heirloom Brown Bread
------------
Actual Ingredients:
dates, deglet noor
leavening agents, baking soda
milk, buttermilk, fluid, cultured, lowfat
molasses
raisins, seeded
wheat flour, white, all-purpose, unenriched
------------
Generated Ingredients: 0
apple juice, canned or bottled, unsweetened, without added ascorbic acid
candies, marshmallows
salt, table
sorghum flour, refined, unenriched
spices, caraway seed
spices, garlic powder
------------
Generated Ingredients: 1
cranberries, dried, sweetened
leavening agents, baking soda
pectin, unsweetened, dry mix
spices, turmeric, ground
tangerines, (mandarin oranges), raw
wheat flour, white, all-purpose, unenriched
------------
Generated Ingredients: 2
alcoholic beverage, distilled, gin, 90 proof
bulgur, dry
grapes, red or green ( european type, such as thompson seedless), raw
salt, table
spices, ginger, ground
syrup, cane
------------
Generated Ingredients: 3
...

*FIG. 5B*

Figure 5C:
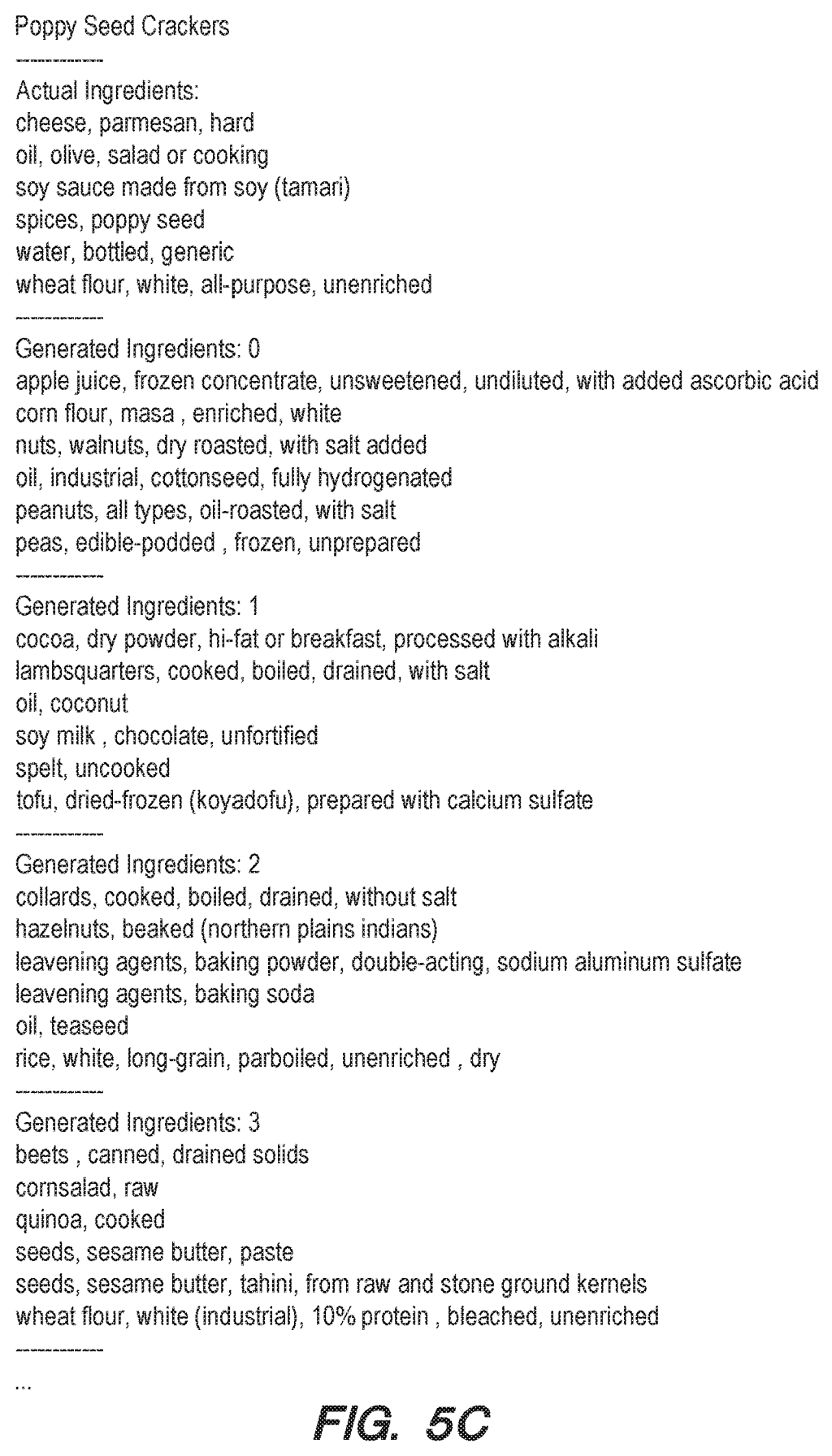

Poppy Seed Crackers

------------

Actual Ingredients:
cheese, parmesan, hard
oil, olive, salad or cooking
soy sauce made from soy (tamari)
spices, poppy seed
water, bottled, generic
wheat flour, white, all-purpose, unenriched

------------

Generated Ingredients: 0
apple juice, frozen concentrate, unsweetened, undiluted, with added ascorbic acid
corn flour, masa , enriched, white
nuts, walnuts, dry roasted, with salt added
oil, industrial, cottonseed, fully hydrogenated
peanuts, all types, oil-roasted, with salt
peas, edible-podded , frozen, unprepared

------------

Generated Ingredients: 1
cocoa, dry powder, hi-fat or breakfast, processed with alkali
lambsquarters, cooked, boiled, drained, with salt
oil, coconut
soy milk , chocolate, unfortified
spelt, uncooked
tofu, dried-frozen (koyadofu), prepared with calcium sulfate

------------

Generated Ingredients: 2
collards, cooked, boiled, drained, without salt
hazelnuts, beaked (northern plains indians)
leavening agents, baking powder, double-acting, sodium aluminum sulfate
leavening agents, baking soda
oil, teaseed
rice, white, long-grain, parboiled, unenriched , dry

------------

Generated Ingredients: 3
beets , canned, drained solids
cornsalad, raw
quinoa, cooked
seeds, sesame butter, paste
seeds, sesame butter, tahini, from raw and stone ground kernels
wheat flour, white (industrial), 10% protein , bleached, unenriched

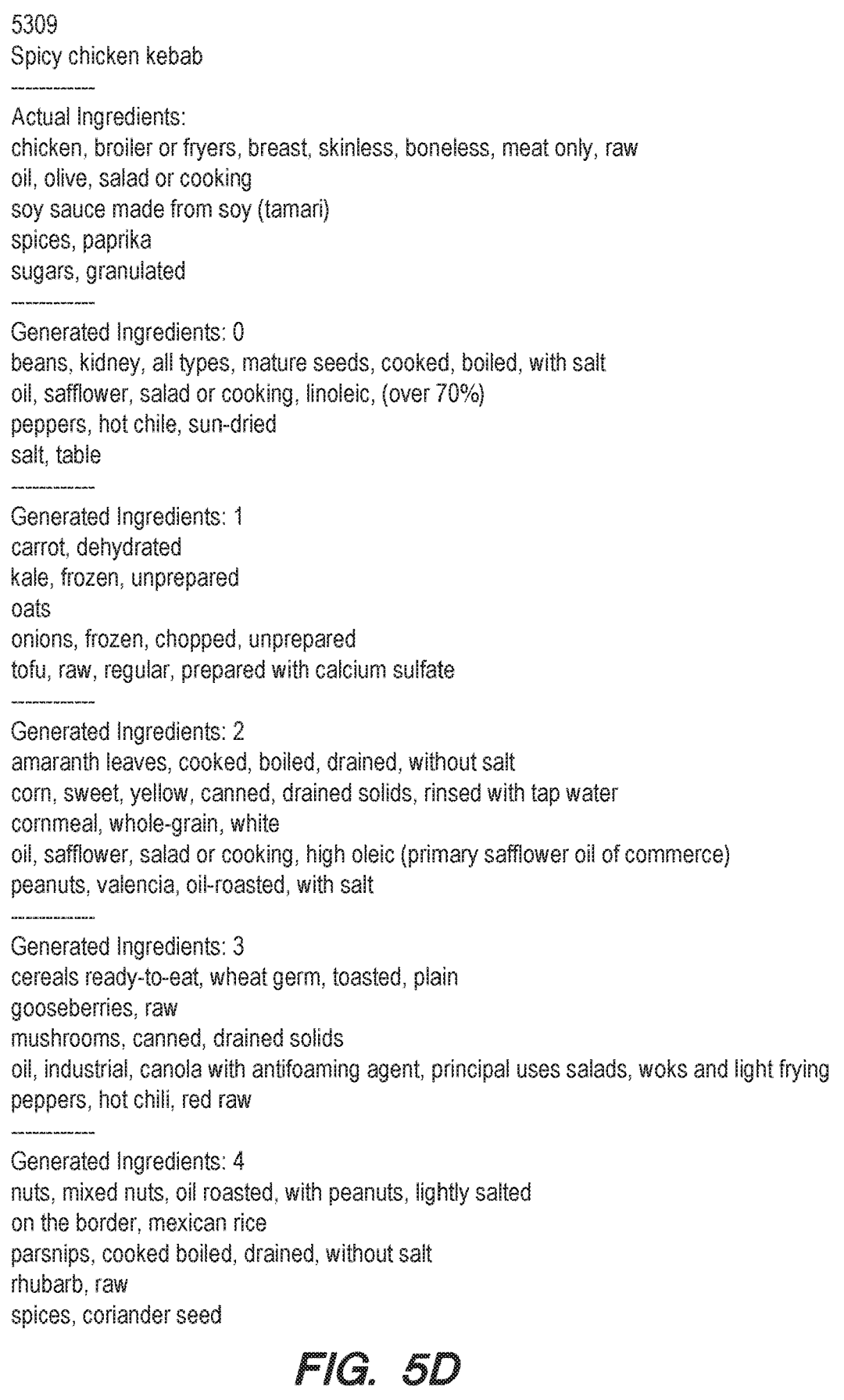

5309
Spicy chicken kebab
------------
Actual Ingredients:
chicken, broiler or fryers, breast, skinless, boneless, meat only, raw
oil, olive, salad or cooking
soy sauce made from soy (tamari)
spices, paprika
sugars, granulated
------------
Generated Ingredients: 0
beans, kidney, all types, mature seeds, cooked, boiled, with salt
oil, safflower, salad or cooking, linoleic, (over 70%)
peppers, hot chile, sun-dried
salt, table
------------
Generated Ingredients: 1
carrot, dehydrated
kale, frozen, unprepared
oats
onions, frozen, chopped, unprepared
tofu, raw, regular, prepared with calcium sulfate
------------
Generated Ingredients: 2
amaranth leaves, cooked, boiled, drained, without salt
corn, sweet, yellow, canned, drained solids, rinsed with tap water
cornmeal, whole-grain, white
oil, safflower, salad or cooking, high oleic (primary safflower oil of commerce)
peanuts, valencia, oil-roasted, with salt
------------
Generated Ingredients: 3
cereals ready-to-eat, wheat germ, toasted, plain
gooseberries, raw
mushrooms, canned, drained solids
oil, industrial, canola with antifoaming agent, principal uses salads, woks and light frying
peppers, hot chili, red raw
------------
Generated Ingredients: 4
nuts, mixed nuts, oil roasted, with peanuts, lightly salted
on the border, mexican rice
parsnips, cooked boiled, drained, without salt
rhubarb, raw
spices, coriander seed

*FIG. 5D*

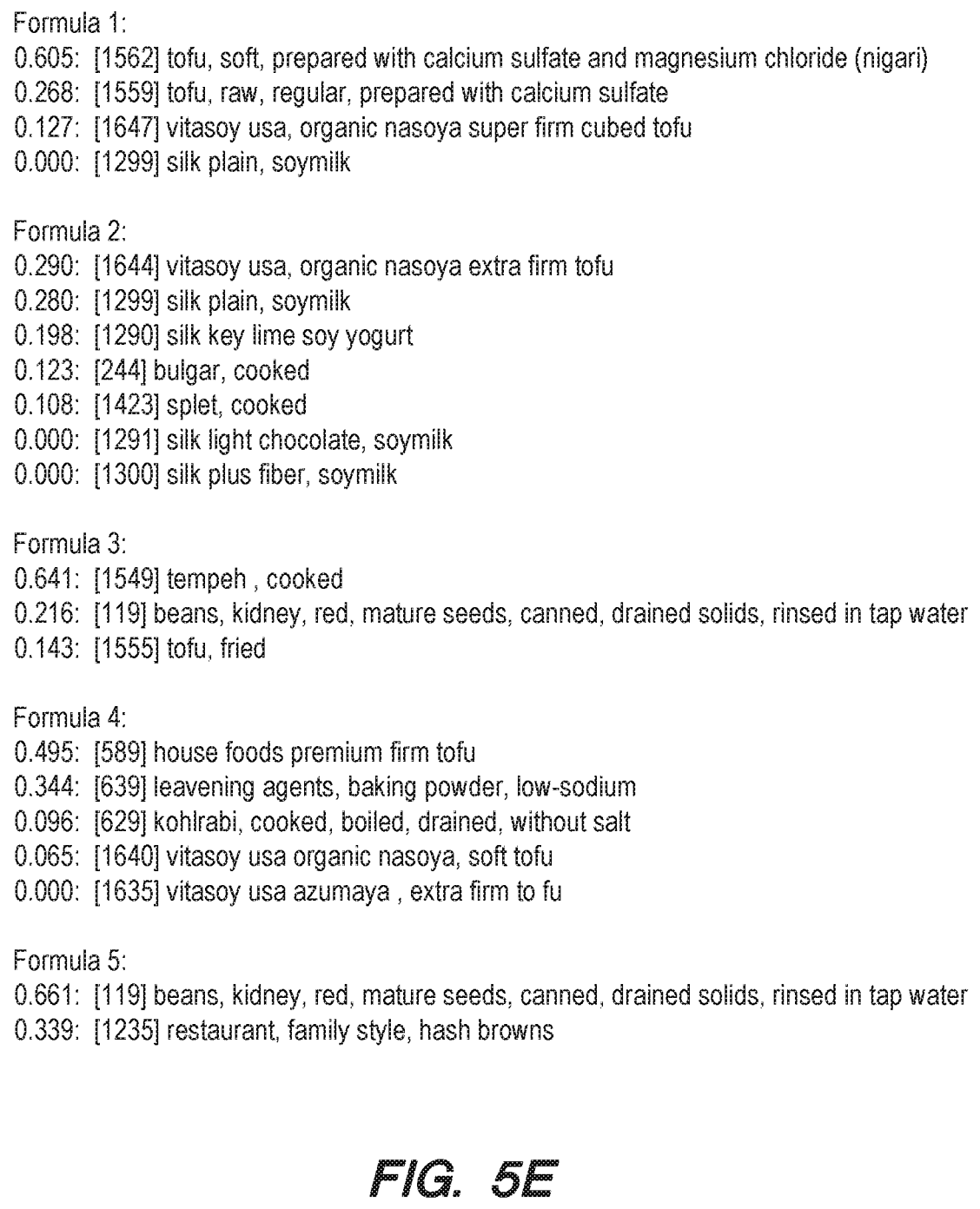

Formula 1:
0.605: [1562] tofu, soft, prepared with calcium sulfate and magnesium chloride (nigari)
0.268: [1559] tofu, raw, regular, prepared with calcium sulfate
0.127: [1647] vitasoy usa, organic nasoya super firm cubed tofu
0.000: [1299] silk plain, soymilk Formula 2:
0.290: [1644] vitasoy usa, organic nasoya extra firm tofu
0.280: [1299] silk plain, soymilk
0.198: [1290] silk key lime soy yogurt
0.123: [244] bulgar, cooked
0.108: [1423] splet, cooked
0.000: [1291] silk light chocolate, soymilk
0.000: [1300] silk plus fiber, soymilk Formula 3:
0.641: [1549] tempeh , cooked
0.216: [119] beans, kidney, red, mature seeds, canned, drained solids, rinsed in tap water
0.143: [1555] tofu, fried Formula 4:
0.495: [589] house foods premium firm tofu
0.344: [639] leavening agents, baking powder, low-sodium
0.096: [629] kohlrabi, cooked, boiled, drained, without salt
0.065: [1640] vitasoy usa organic nasoya, soft tofu
0.000: [1635] vitasoy usa azumaya , extra firm to fu Formula 5:
0.661: [119] beans, kidney, red, mature seeds, canned, drained solids, rinsed in tap water
0.339: [1235] restaurant, family style, hash browns

*FIG. 5E*

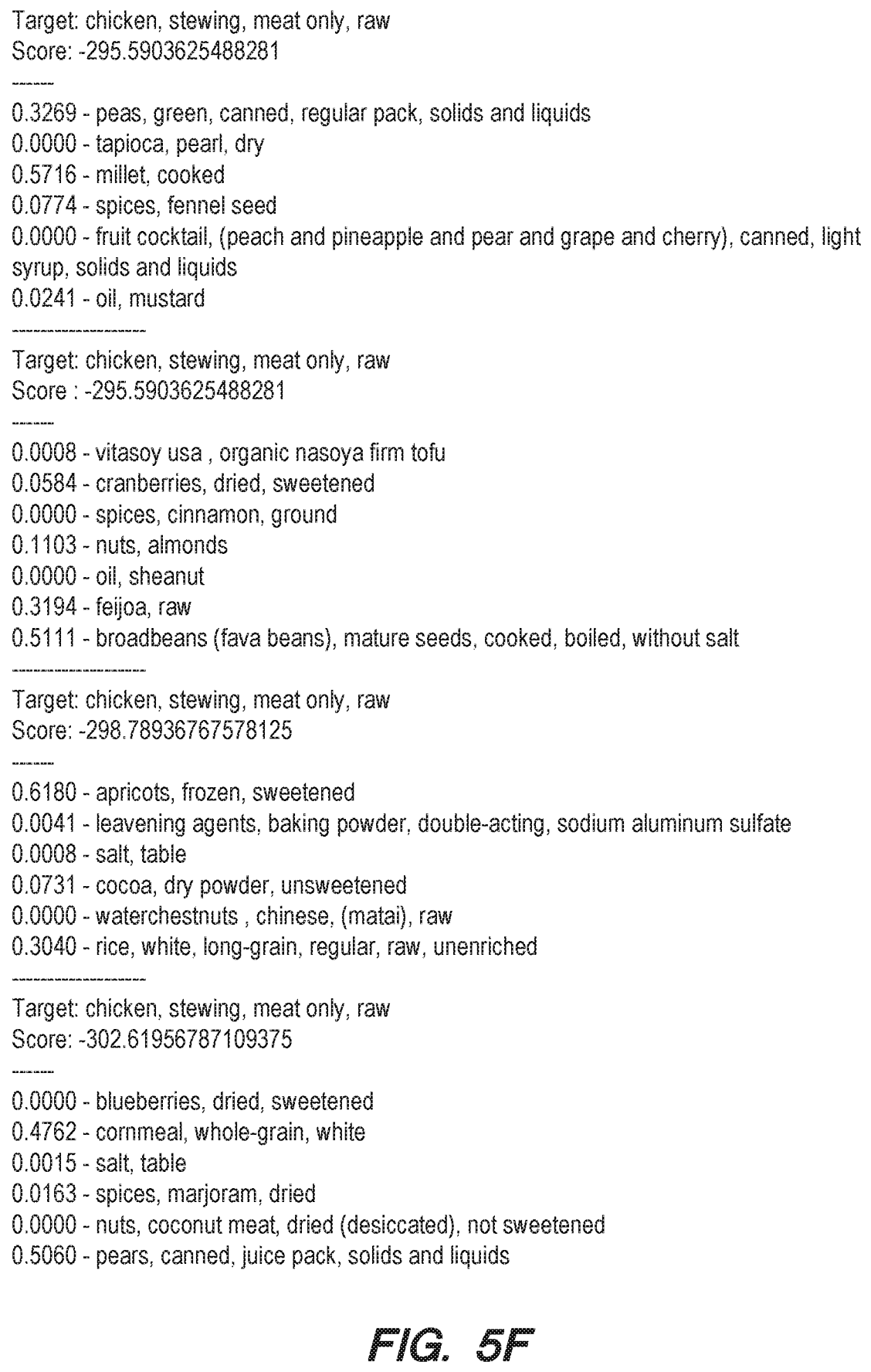

Target: chicken, stewing, meat only, raw
Score: -295.5903625488281
-------
0.3269 - peas, green, canned, regular pack, solids and liquids
0.0000 - tapioca, pearl, dry
0.5716 - millet, cooked
0.0774 - spices, fennel seed
0.0000 - fruit cocktail, (peach and pineapple and pear and grape and cherry), canned, light syrup, solids and liquids
0.0241 - oil, mustard
--------------------
Target: chicken, stewing, meat only, raw
Score : -295.5903625488281
-------
0.0008 - vitasoy usa , organic nasoya firm tofu
0.0584 - cranberries, dried, sweetened
0.0000 - spices, cinnamon, ground
0.1103 - nuts, almonds
0.0000 - oil, sheanut
0.3194 - feijoa, raw
0.5111 - broadbeans (fava beans), mature seeds, cooked, boiled, without salt
--------------------
Target: chicken, stewing, meat only, raw
Score: -298.78936767578125
-------
0.6180 - apricots, frozen, sweetened
0.0041 - leavening agents, baking powder, double-acting, sodium aluminum sulfate
0.0008 - salt, table
0.0731 - cocoa, dry powder, unsweetened
0.0000 - waterchestnuts , chinese, (matai), raw
0.3040 - rice, white, long-grain, regular, raw, unenriched
--------------------
Target: chicken, stewing, meat only, raw
Score: -302.61956787109375
-------
0.0000 - blueberries, dried, sweetened
0.4762 - cornmeal, whole-grain, white
0.0015 - salt, table
0.0163 - spices, marjoram, dried
0.0000 - nuts, coconut meat, dried (desiccated), not sweetened
0.5060 - pears, canned, juice pack, solids and liquids

*FIG. 5F*

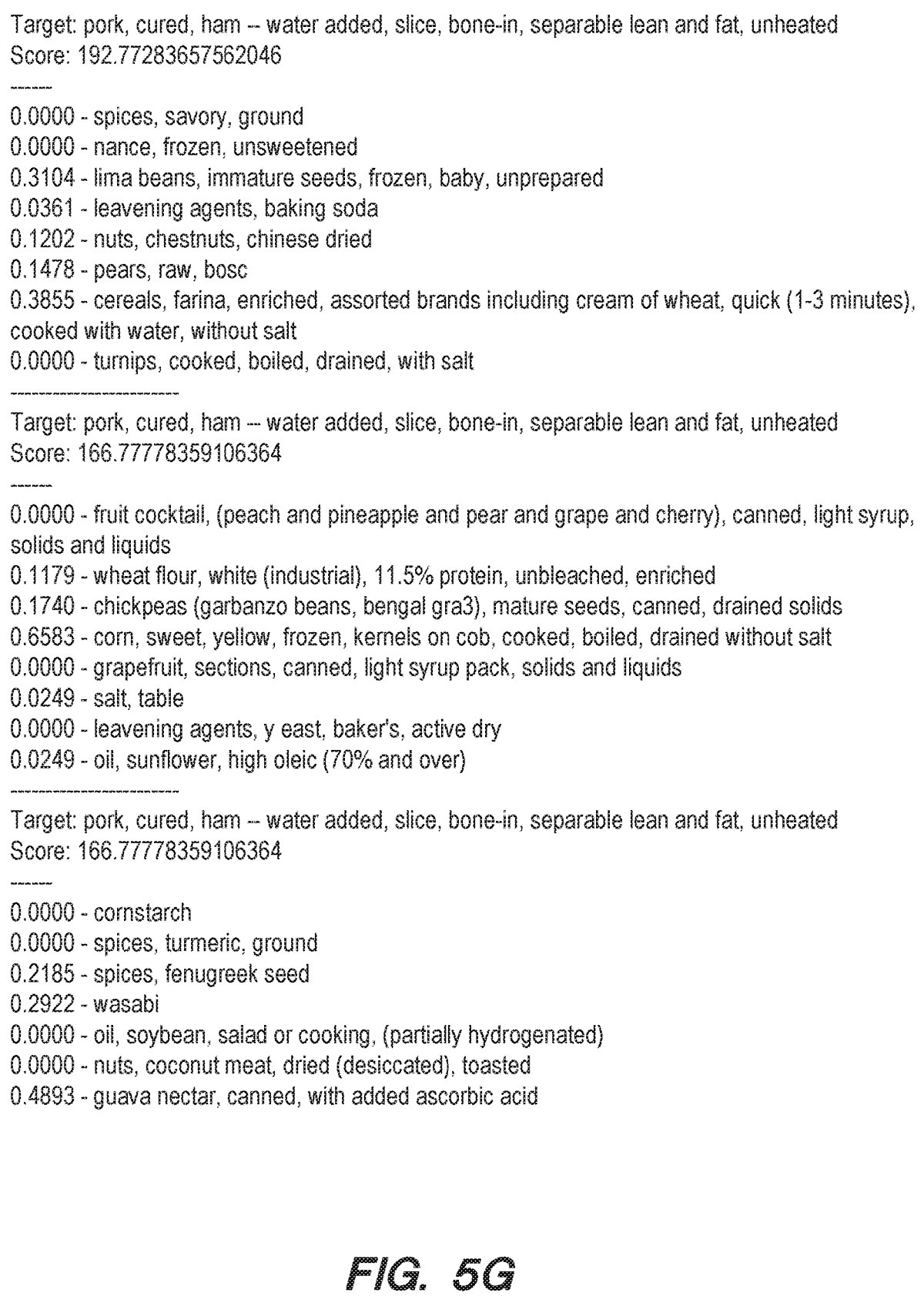

Target: pork, cured, ham -- water added, slice, bone-in, separable lean and fat, unheated
Score: 192.77283657562046
------
0.0000 - spices, savory, ground
0.0000 - nance, frozen, unsweetened
0.3104 - lima beans, immature seeds, frozen, baby, unprepared
0.0361 - leavening agents, baking soda
0.1202 - nuts, chestnuts, chinese dried
0.1478 - pears, raw, bosc
0.3855 - cereals, farina, enriched, assorted brands including cream of wheat, quick (1-3 minutes), cooked with water, without salt
0.0000 - turnips, cooked, boiled, drained, with salt
------------------------
Target: pork, cured, ham -- water added, slice, bone-in, separable lean and fat, unheated
Score: 166.77778359106364
------
0.0000 - fruit cocktail, (peach and pineapple and pear and grape and cherry), canned, light syrup, solids and liquids
0.1179 - wheat flour, white (industrial), 11.5% protein, unbleached, enriched
0.1740 - chickpeas (garbanzo beans, bengal gra3), mature seeds, canned, drained solids
0.6583 - corn, sweet, yellow, frozen, kernels on cob, cooked, boiled, drained without salt
0.0000 - grapefruit, sections, canned, light syrup pack, solids and liquids
0.0249 - salt, table
0.0000 - leavening agents, y east, baker's, active dry
0.0249 - oil, sunflower, high oleic (70% and over)
------------------------
Target: pork, cured, ham -- water added, slice, bone-in, separable lean and fat, unheated
Score: 166.77778359106364
------
0.0000 - cornstarch
0.0000 - spices, turmeric, ground
0.2185 - spices, fenugreek seed
0.2922 - wasabi
0.0000 - oil, soybean, salad or cooking, (partially hydrogenated)
0.0000 - nuts, coconut meat, dried (desiccated), toasted
0.4893 - guava nectar, canned, with added ascorbic acid

*FIG. 5G*

LATENT SPACE METHOD OF GENERATING FOOD FORMULAS

TECHNICAL FIELD

One technical field of the present disclosure is artificial intelligence and machine learning, as applied to food. Another technical field is food science. The disclosure relates, in particular, to use of machine learning to generate food formulas for foods that mimic target food items.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, many negative consequences of use of animals in the food industry are known, such as deforestation, pollution, human health conditions, and allergies, among others. In contrast, a plant-based diet is associated with improved health and well-being and reduces risk of diseases. Not only is a plant-based diet good for our health but it is also good for the Earth's health. Research has shown that production of plant-based food items generates less greenhouse emissions and require less energy, water, and land than production of animal-based food items. There are plant alternatives to animal-based food items. For example, plant alternatives to meat include veggie burgers and other vegan meat food items. However, these alternatives do not match the taste and texture of meat.

Accordingly, there is a need for improved techniques to mimic a target food item, such as an animal-based target food item, by matching nutritional and sensory attributes as much as possible. Unfortunately, many techniques for development of new foods rely upon time-consuming, inaccurate, manual laboratory work in which different ingredients are combined in different ways and tested. These approaches are inefficient, involve extensive time to develop a single successful food formula, and waste physical resources.

SUMMARY

The appended claims may serve as a summary of the invention.

BRIEF DESCRIPTION OF THE FIGURES

The present invention is illustrated by way of example, and not by way of limitation, in the figures of the accompanying drawings and in which like reference numerals refer to similar elements and in which:

FIGS. 5A, 5B, 5C, and 5D each shows alternative sets of decoded ingredients for a recipe.

FIGS. 5E, 5F and 5G each shows alternative formulas for a target food item.

DETAILED DESCRIPTION

Figure 1:
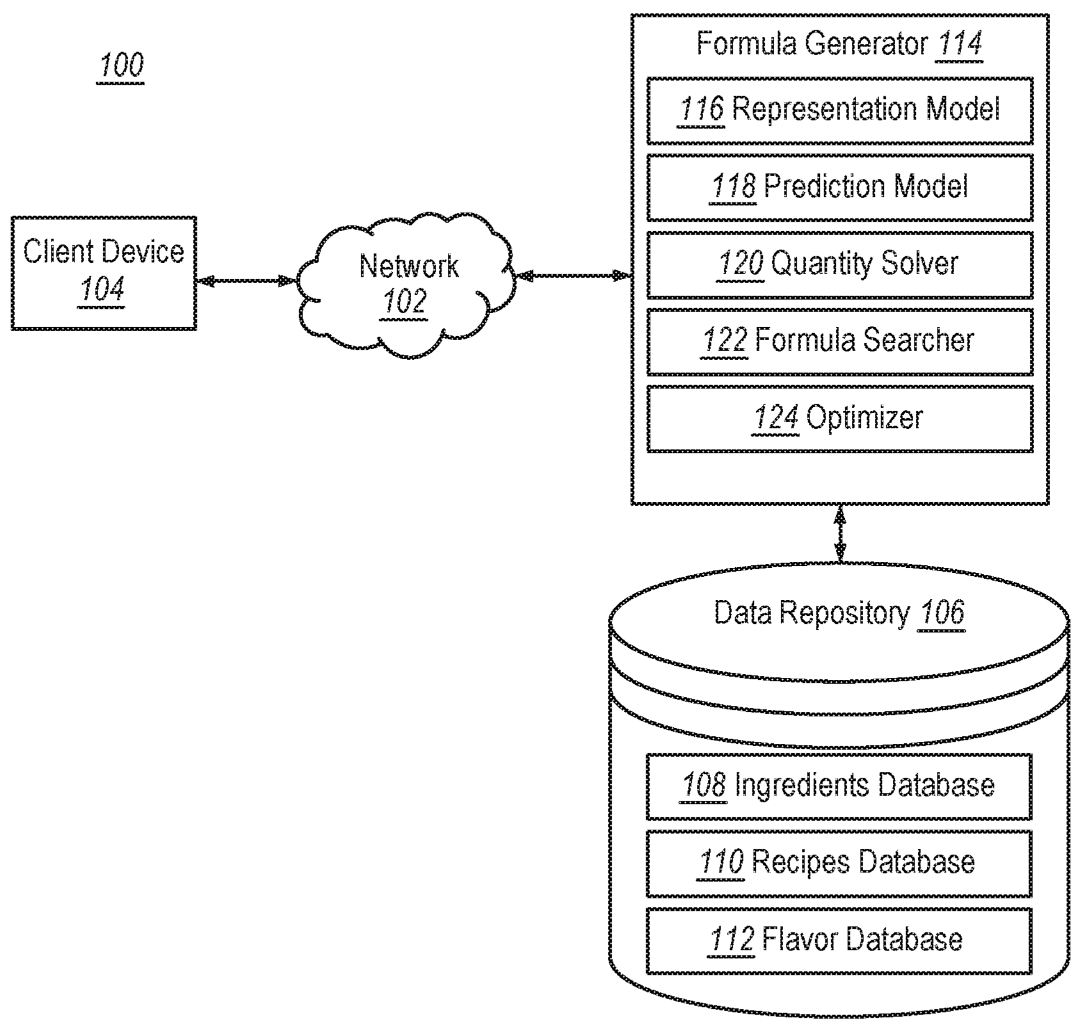
FIG. 1 illustrates an example networked computer system with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
2.0 STRUCTURAL OVERVIEW
3.0 FUNCTIONAL OVERVIEW
  3.1 REPRESENTATION MODEL
  3.2 PREDICTION MODEL
  3.3 QUANTITY SOLVER
  3.4 FORMULA SEARCHER
4.0 PROCEDURAL OVERVIEW
5.0 HARDWARE OVERVIEW
6.0 SOFTWARE OVERVIEW
7.0 OTHER ASPECTS OF DISCLOSURE

1.0 GENERAL OVERVIEW

In an embodiment, a set of computer programs implementing a formula generator include a first neural network that outputs an ingredient knowledge representation (an ingredient vocabulary embedding matrix), in a first stage, from ingredients from an ingredients database. The formula generator includes a second neural network that outputs a latent space with a probability distribution of sets of ingredients, in a second stage, from recipes from a recipes database. To generate a candidate set of ingredients to mimic an animal-based target food item, the latent space may be sampled and decoded in a vegan space by instructions programmed for masking ingredients in the ingredient vocabulary embedding matrix that are animal-based. Consequently, the generated set of ingredients includes only plant-based ingredients.

In an embodiment, a computer-implemented method to generate a candidate formula of a plant-based food item using a set of ingredients to mimic a target food item that is not plant-based, comprises collecting first digital data representing a plurality of ingredients from an ingredients database, representing each ingredient in the plurality of ingredients as a digitally stored input vector, creating a first training set for use in training a first neural network, the first training set comprising a plurality of input vectors associated with the plurality of ingredients, and training, using the first training set, the first neural network in a first stage to generate an ingredient vocabulary embedding matrix. The ingredient vocabulary embedding matrix is stored in digital memory. The method also comprises collecting second digital data representing a set of recipes from a recipes database, extracting third digital data representing recipe ingredient from each recipe in the set of recipes, representing each recipe ingredients for each recipe in the set of recipes as a digitally stored vector to result in groups of vectors that are associated with the set of recipes, creating a second training set for use in training a second neural network, the second training set comprising the groups of vectors that are associated with the set of recipes, and training, using the second training set, the second neural network in a second stage to obtain a latent space with a probability distribution of the second training set. The latent space is stored in digital memory. The method also comprises sampling the latent space of the second neural network to generate a first candidate set of ingredients. The first candidate set of ingredients is generated based on the ingredient vocabulary embedding matrix of the first neural network.

Other embodiments, aspects, and features will become apparent from the reminder of the disclosure as a whole.

2.0 STRUCTURAL OVERVIEW

FIG. 1 illustrates an example networked computer system 100 with which various embodiments may be practiced. FIG. 1 is shown in simplified, schematic format for purposes of illustrating a clear example and other embodiments may include more, fewer, or different elements. FIG. 1, and the other drawing figures and all of the description and claims in this disclosure, are intended to present, disclose and claim a technical system and technical methods comprising specially programmed computers, using a special-purpose distributed computer system design and instructions that are programmed to execute the functions that are described. These elements execute functions that have not been available before to provide a practical application of computing technology to the problem of generating formulas for plant-based foods. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In some embodiments, the networked computer system comprises a client device(s) 104, a server computer, a data repository(ies) 106, which are communicatively coupled directly or indirectly via one or more networks 102.

The server computer utilizes a set of one or more computer programs or sequences of program instructions that implement machine learning algorithms to generate a formula using ingredients to mimic a given target food item in flavor, color, feel and/or functionality. Programs or sequences of instructions organized to implement the formula generating functions in this manner may be referred to herein as a formula generator 114. In an embodiment, the server computer broadly represents one or more computers, such as one or more desktop computers, server computers, a server farm, a cloud computing platform (like Amazon EC2, Google Cloud, container orchestration (Kubernetes, Docker, etc.), or a parallel computer, virtual computing instances in public or private datacenters, and/or instances of a server-based application.

The formula generator 114 comprises a representation model 116, a prediction model 118, a quantity solver 120, a formula searcher 122, and an optional optimization layer or optimizer 124. The components of the formula generator 114 may be implemented using software, hardware, firmware, or a combination thereof. In one embodiment, each of the representation model 116, prediction model 118, quantity solver 120, formula searcher 122, and optimization layer or optimizer 124 comprise one or more sequences of computer program instructions that are programmed to execute the functions that are described herein for the foregoing elements. In an embodiment, one or more components of the formula generator 114 may include a processor configured to execute instructions stored in a non-transitory computer readable medium.

In an embodiment, the representation model 116 is programmed to generate a latent or encoded representation of each of a plurality of ingredients obtained from different sources of knowledge, including open source databases such as those associated with the U.S. Department of Agriculture's (USDA) National Agricultural Library. The representation model 116 may use an autoencoder architecture to compress the knowledge (e.g., ingredients) into a latent space Z. The latent or encoded representation is a condensed knowledge of ingredients or ingredient vocabulary embeddings.

In an embodiment, the prediction model 118 is programmed to learn an encoded search space R (e.g., a latent space with a probability distribution) and to decode any latent vector r from the encoded search space R into a candidate set of ingredients. The prediction model 118 may use a variational autoencoder architecture to compress sets of ingredients extracted from existing recipes from the data repository 106 into the encoded search space R. The prediction model 118 uses transfer learning (e.g., ingredient vocabulary embeddings) from the representation model 116 to encode and decode the sets of ingredients. The prediction model 118 may generate as many candidate sets of ingredients as needed or desired by sampling different points in the encoded search space R.

In an embodiment, the quantity solver 120 is programmed to receive a target food item and a candidate set of ingredients generated by the prediction model 118 and to determine a quantity, amount or proportion for each of the ingredients in the candidate set, based on the target food item, resulting in a candidate formula (set of ingredients and proportions). The quantity solver 120 may formulate a constrained vertex optimization problem as a quantity solver objective function to determine the proportions of the ingredients and to determine a score for the candidate formula. The score relates to how close the candidate formula is to the target food item. In an embodiment, the problem may be solved in a particular feature space, such as the USDA feature space.

In an embodiment, the optimizer 124 is programmed to learn, from existing recipes, how ingredients are usually combined. The optimizer 124 is programmed to receive a target food item and a candidate set of ingredients generated by the prediction model 118 and to determine, based on the learned combinations, new representations of the target food item and the candidate set of ingredients, which may be used by the quantity solver 120 to determine a quantity for each of the ingredients in the candidate set of ingredients and a corresponding score.

In an embodiment, the formula searcher 122 is programmed to, given the encoded search space R of sets of ingredients and a target food item, find an optimal formula from a plurality of candidate formulas to reconstruct or mimic the target food item. The formula searcher 122 may perform one or more different searches, such as a local search and a global search. The local search may encode a target recipe into the probability distribution, and sample and decode that distribution. The global search may use an optimization technique to search within the encoded search space R of sets of ingredients and evaluates each candidate formula using the quantity solver objective function. Example optimization techniques are a Bayesian optimization technique, a black box optimization technique, and a gradient descent optimization technique.

In some embodiments, in keeping with sound software engineering principles of modularity and separation of function, the representation model 116, the prediction model 118, the quantity solver 120, the formula searcher 122, and the optimizer 124 are implemented as a logically separate program, process or library.

Computer executable instructions described herein may be in machine executable code in the instruction set of a CPU and may have been compiled based upon source code written in Python, JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the figure may represent the manner in which programmers or software developers organize and arrange source code for later compilation into an executable, or interpretation into bytecode or the equivalent, for execution by the formula generator 114.

The formula generator 114 may be coupled to the data repository 106 that includes an ingredients database 108, a recipes database 110, and an optional flavor database 112

The ingredients database 108 includes raw ingredients from various sources, such as from USDA's National Agricultural Library. An ingredient may be plant-based, animal-based, water-based, synthetic, or a combination thereof. Some non-limiting examples of plant-based ingredients may include vegetables (e.g., onions, potatoes, garlic, spinach, carrots, celery, squash, etc.), fruits (e.g., apples, pears, grapes, etc.), herbs (e.g., oregano, cilantro, basil, etc.), spices (e.g., black peppers, turmeric, red chili peppers, cinnamon, etc.), oils (e.g., corn oil, olive oil, etc.), nuts (e.g., almonds, walnuts, pistachios, etc.), legumes (e.g., lentils, dried peas, soybeans, etc.), starch, proteins, fibers, carbohydrates, sugar, etc. Some non-limiting examples of animal-based ingredients may include dairy products (e.g., milk, butter, cheese, yogurt, ice cream, etc.), egg-based products (e.g., mayonnaise, salad dressings, etc.), meat products (e.g., burger patties, sausages, hot dogs, bacon, etc.), and/or seafood (e.g., fish, crab, lobsters, etc.). Synthetic ingredients may include artificially produced food, e.g., artificial meats, artificial sweeteners, artificial milk, etc.

In an embodiment, each ingredient in the ingredients database 108 may be associated with a USDA ingredient vector, which is a list of values relating to chemical, nutritional, and/or molecular descriptors or features. In an embodiment, each ingredient in the ingredients database 108 may also be associated with a word embedding, such as a Bidirectional Encoder Representations from Transformer (BERT) embedding, that may be trained on recipes in the recipes database 110. Other word embedding may be used, such as Word2Vec, Glove, or another suitable embedding model. The USDA ingredient vectors and the BERT embeddings may be stored with the ingredients in the ingredients database 108 or separately from the ingredients in one or more other databases.

The recipes database 110 includes recipes collected by scraping various websites and proprietary recipes. Each recipe may include raw text. As an example, each recipe may include a list of ingredients that may specify a name of each ingredient, quantity of each ingredient, a state of each ingredient (e.g., four avocadoes, halved and pitted). Each recipe may also include directions to describe a list of instructions for cooking the ingredients. In an embodiment, a recipe may also include properties of the food dish associated with the recipe. The properties may include human sensorial feedback such as taste (e.g., salt, sweet, bitter, sour, and umami), texture descriptors, acceptance, and the like, and a picture of the food dish. In an embodiment, color(s) may be extracted from the picture and associated with the recipe.

In an embodiment, the proprietary recipes may be plant-based and include human feedback. In an embodiment, the proprietary recipes are developed by the Applicant. In an embodiment, the proprietary recipes may be stored in a different database separate from other recipes, such as those collected by scraping various website.

The flavor database 112 includes molecular information and flavor information for each ingredient in the ingredients database 108. In an embodiment, the molecular information for an ingredient may be represented as a binary vector indicating the presence of the different molecular features in the ingredient. In an embodiment, the flavor information may be a normalized sum of flavor features corresponding to the ingredient molecules. In an embodiment, the molecular information and the flavor information may be obtained from open-source databases.

In an embodiment, the names of the ingredients in the recipes database 110 and the flavor database 112 may be canonicalized, using an ingredient mapping tool, such that the names of the ingredients match with the ingredient names used by the USDA. In an embodiment, missing features in the molecular information and the flavor information for ingredients that correspond with the ingredients in the ingredients database 108 may be filled with an average value for that feature.

The data repository 106 may include other databases storing proprietary data (e.g., FTIR, gas chromatography, texturometer, physiochemical (viscosity, pH, etc.), and other features), relating to each ingredient in the recipes database 110, and other information (e.g., flavor wheel, ingredient vocabulary embedding matrix, etc.) that may be used by the formula generator 114. Each database 108, 110, 112 may be implemented using memory, e.g., RAM, EEPROM, flash memory, hard disk drives, optical disc drives, solid state memory, or any type of memory suitable for database storage.

The network 102 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 102 and the disclosure presumes that all elements of FIG. 1 are communicatively coupled via the network 102. The various elements depicted in FIG. 1 may also communicate with each other via direct communications links that are not depicted in FIG. 1 for purposes of explanation.

The formula generator 114 is accessible over the network 102 by multiple computing devices, such as a client device 104, to request a candidate formula (set of ingredients and proportions) based on a target food item. The client device 104 may comprise a desktop computer, laptop computer, tablet computer, smartphone, or any other type of computing device that allows access to the formula generator 114. The elements in FIG. 1 are intended to represent one workable embodiment but are not intended to constrain or limit the number of elements that could be used in other embodiments.

3.0 FUNCTIONAL OVERVIEW

In an embodiment, the representation model 116, the prediction model 118, the quantity solver 120, the formula searcher 122, and the optimizer 124 interoperate programmatically in an unconventional manner to generate one or more candidate formulas, for a target food item, with specific sensorial properties and/or desired characteristics, and to select an optimal formula from the candidate formulas. Each candidate formula may identify one or more ingredients and their respective proportions (e.g., percentage or quota).

One or more candidate formulas, such as an optimal formula, may be displayed on the client device 104. In an embodiment, an optimal formula may be transmitted downstream to a recipe generator for further processing such as to determine a new recipe including a set of cooking directions or instructions for that formula. An example recipe generator is described in co-pending U.S. patent application Ser. No. 16/416,095, filed May 17, 2019, titled "Systems and Methods to Mimic Target Good Items using Artificial Intelligence," wherein the entire contents of which are hereby incorporated by reference as if fully set forth herein.

3.1 Representation Model

Figure 2A:
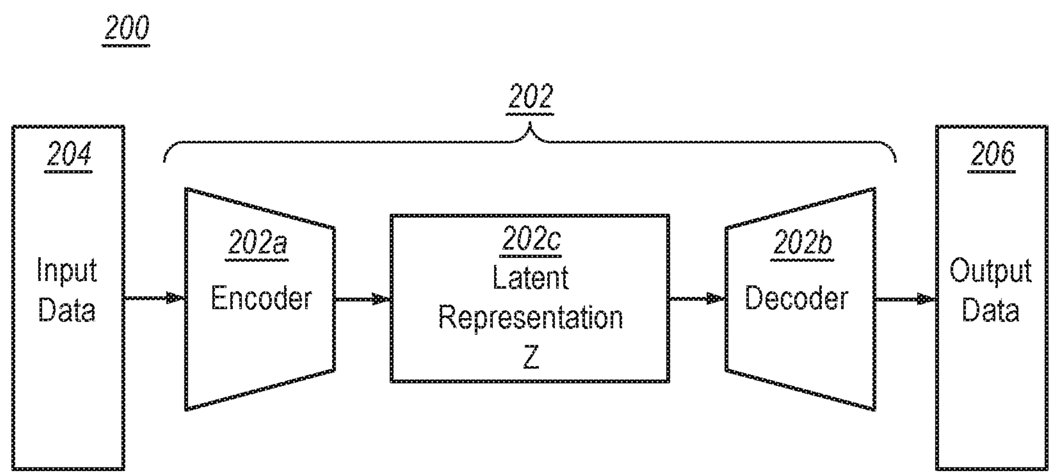
FIG. 2A illustrates an example representation model in accordance with some embodiments.

FIG. 2A illustrates an example representation model in accordance with some embodiments. In an embodiment, the representation model 116 of FIG. 1 may be similarly configured as a representation model 200 of FIG. 2A.

During a representation stage, the representation model 200 may use an autoencoder 202, such as a neural network, to learn an identity function in an unsupervised way to reconstruct the original input while compressing the data to discover a more efficient and compressed representation. The autoencoder 202 includes an encoder 202*a* and a decoder 202*b*. The autoencoder 202 trains on input data 204 (e.g., ingredients from the ingredients database 108). Using the input data 204, the encoder 202*a* reduces the input dimensions and compresses the input data into an encoded representation 202*c*. The encoded representation 202*c* contains the lowest possible dimensions of the input data 204. The decoder 202*b* produces output data 206 by reconstructing the data from the encoded representation 202*c* to be as close to the original input 204 as possible.

The input data 204 may include, for each ingredient from the ingredients database 108 of FIG. 1, an input vector comprising at least the USDA ingredient vector corresponding to the ingredient. In an embodiment, the input vector may also include a BERT embedding corresponding to the ingredient. In an embodiment, the input vector may also include other features for the ingredient, such as molecular features and flavor features. In an embodiment, the input vector is a concatenation of the BERT embedding and/or one or more other features with the USDA ingredient vector.

The autoencoder 202 may be trained on the different ingredients from the ingredients database 108. The training data may be curated by including more or less data (e.g., USDA ingredient vectors, BERT embeddings, molecular features, flavor features) from the data repository 106. Training of the autoencoder 202 involves using back propagation to minimize reconstruction loss, which is a measure of how well the decoder 202*b* is performing and how close output data 206 is to input data 204.

A NaN (not a number) mask may be applied on one or more portions of the input vector for missing corresponding entries (e.g., USDA ingredient, BERT ingredient) in the input vector. In an embodiment, the NaN mask may be used to select plant-based ingredients as candidates to generate animal-based formulas. In an embodiment, the NaN mask may be used to exclude any unwanted ingredients because, for example, they are out of stock or are too expensive.

In an embodiment, the autoencoder 202 may be trained such that weighted reconstruction loss is minimized according to $$L_{total}=w_1*L_{USDA}*\text{NAN\_MASK}_{USDA}+w_2*L_{BERT}$$

where $L_{USDA}$ is the loss for the USDA ingredient vector, $L_{BERT}$ is the loss for the BERT embedding, $w_1$ and $w_2$ are weights for corresponding $L_{USDA}$ and $L_{BERT}$, respectively. The $\text{NAN\_MASK}_{USDA}$ is a binary mask that indicates the NaN in the USDA dataset.

In an embodiment, the weighted reconstruction loss function may be adjusted according to the training data. For example, if the training data also includes molecular features and/or flavor features, then the weighted reconstruction loss function may be adjusted to take into consideration the loss of each of these features (e.g., sum of losses). Each of these features can be individually weighted and/or masked.

Figure 2B:
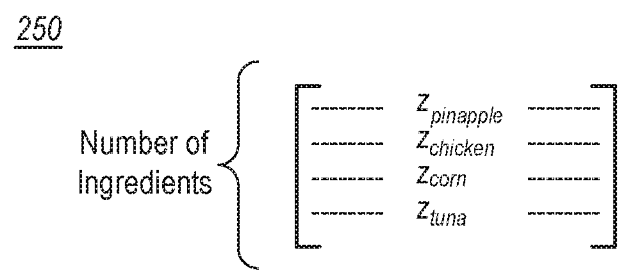
FIG. 2B illustrates an example ingredient vocabulary embedding matrix in accordance with some embodiments.

The encoded representation 202*c*, which is the ingredient vocabulary embeddings, may be represented as a matrix. FIG. 2B illustrates an example ingredient vocabulary embedding matrix 250 in accordance with some embodiments. As shown in FIG. 2B, each row in the matrix 250 is a row vector representing a latent representation of an ingredient (e.g., encoded vectors). Each row vector may have 64 dimensions, although fewer or more dimensions are possible, depending on neural network design.

The encoded representation or ingredient vocabulary embeddings 202*c* from the autoencoder 202 (e.g., transfer learning) may be used in various applications, such as by the prediction model 118 during a prediction phase to determine one or more candidate sets of ingredients for a target food item.

3.2 Prediction Model

Figure 3A:
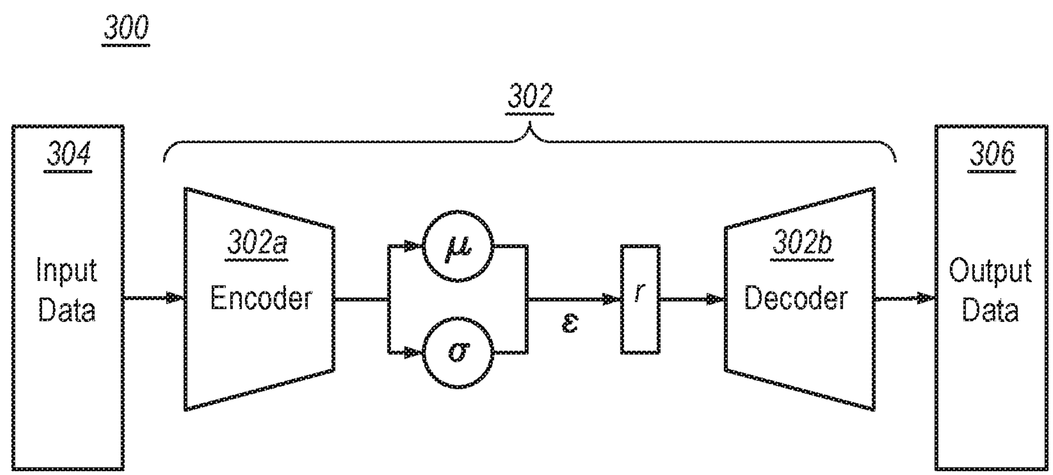
FIG. 3A illustrates an example prediction model in accordance with some embodiments.

FIG. 3A illustrates an example prediction model in accordance with some embodiments. In an embodiment, the prediction model 118 of FIG. 1 is similarly configured as a prediction model 300 of FIG. 3A.

During a prediction phase, the prediction model 300 may use a variational autoencoder (VAE) 302, such as a generative neural network, whose encodings distribution is regularized during training such that its latent space R has particular properties to generate new data. Alternatively, the prediction model 300 may use a Wasserstein autoencoder.

In an embodiment, the VAE 302 may include a beta variational autoencoder (β-VAE) encoder 302*a* and a β-VAE decoder 302*b*. The β-VAE encoder 302*a* trains on input data 304 (e.g., sets of ingredients extracted from recipes from the recipes database 110) and transforms it into a latent space R. The β-VAE decoder 302*b* samples from the latent representation R to sets of ingredients as output 306.

Unlike the encoder 202*a* of the autoencoder 202, the β-VAE encoder 302*a* does not output an encoded vector. Rather, the β-VAE encoder 302*a* determines the probability distribution (Gaussian distribution) of R from the sets of ingredients that can be described by its mean and its standard deviation. The β-VAE encoder 302*a* outputs a vector of means μ and a vector of standard deviations σ. A latent code r may be sampled from R and can be approximated as follows:

$$r=\mu+\sigma\odot\epsilon$$

where $\epsilon$ is a noise vector drawn from the distribution ($\epsilon$~N(0,1)).

Figure 3B:
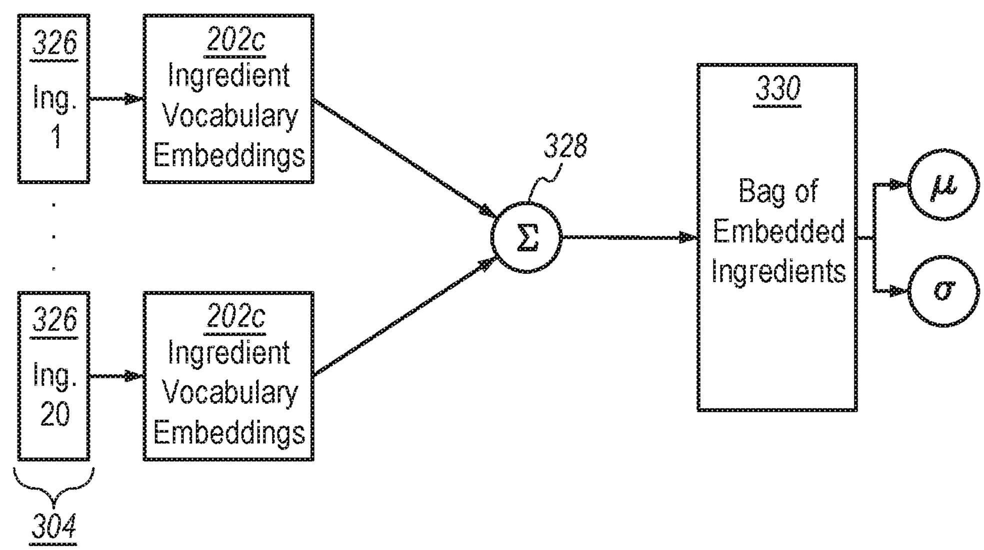
FIG. 3B illustrates an example variational autoencoder (VAE) encoder in accordance with some embodiments.

As shown in FIG. 3B, the β-VAE encoder 302*a* receives USDA ingredient vectors 326 corresponding to a set of ingredients (e.g., INGR 1 to INGR 20) extracted from an existing recipe as input 304. A USDA ingredient vector 326 corresponding with each input ingredient 304 is applied to the ingredient vocabulary embeddings 202*c*, resulting in an encoded or embedded ingredient. A bag of embedded ingredients 330 is derived by summing 328 the embedded ingredients such that the order of the embedded ingredients in the bag of embedded ingredients 330 is irrelevant. The bag of embedded ingredients 330 is used to determine a probability distribution of R. The β-VAE encoder 302*a* outputs a vector of means μ and a vector of standard deviations σ of the distribution of R.

Figures 3C, 3D, 3E:
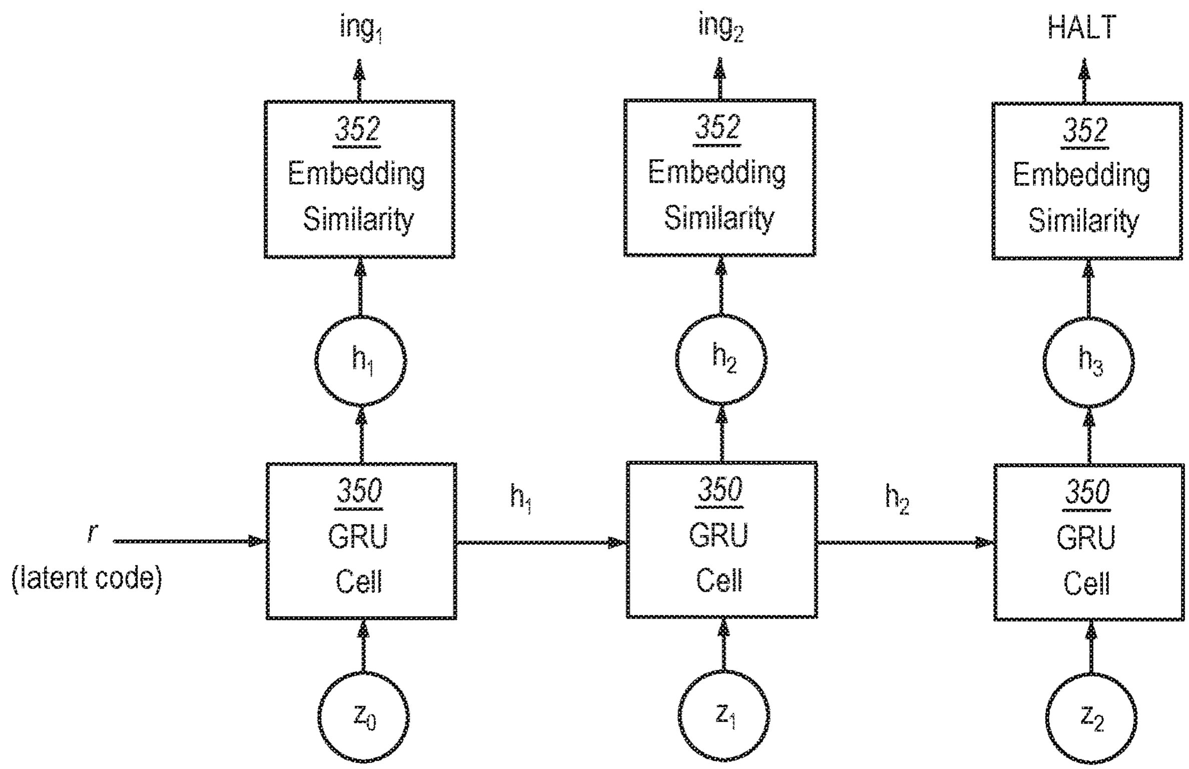
FIG. 3C illustrates an example VAE decoder in accordance with some embodiments.
FIGS. 3D and 3E illustrate example embedding similarity function in accordance with some embodiments.

A latent code r may be sampled from R and decoded using the β-VAE decoder 302*b*. As shown in FIG. 3C, the β-VAE decoder 302*b* may comprise a stacked recurrent neural network (RNN). The stacked RNN may include gated recurrent unit (GRU) cells 350. Alternatively, the stacked RNN may include long short term memory (LSTM) cells. The β-VAE decoder 302*b* uses the latent code r to set its initial state and proceeds to generate an output sequence autoregressively. For example, the first GRU cell 350 of the β-decoder 302*b* accepts the latent code r as an input and generates a hidden state $h_1$ (neural network memory holding information on current data) from the latent code r as an output, while each subsequent GRU cell 350 accept a hidden state $h_{i-1}$ (neural network memory holding information on previous data) from a previous GRU cell 350 as an input and generates its hidden state $h_i$ from the previous hidden state as an output. The GRU cells 350 also accept an input sequence of ingredients, such as bag of embedded ingredients 330. From these inputs, the β-VAE decoder 302*b* produces a set of decoded ingredients.

A decoded ingredient (e.g., $ing_i$) may be determined by applying an embedding similarity function 352 to a respective hidden state (e.g., $h_i$) generated by a GRU cell 350. The embedding similarity function 352 may be the cosine similarity between the hidden state $h_i$ and the ingredient vocabulary embeddings 202*c*. In an embodiment, the Argmax function may be applied to the ingredient vocabulary embeddings 202*c*, and the result of the Argmax function is multiplied to the hidden state $h_i$, as illustrated in FIG. 3D. The Argmax function is an operation that finds the class (e.g., ingredient) with the largest predicted probability.

In an embodiment, to obtain decoded ingredients in a vegan space, animal-based ingredients may be masked in the ingredient vocabulary embeddings 202*c* prior to applying the Argmax function, as illustrated in FIG. 3E. For example, encoded vectors for chicken and tuna are masked (e.g., set to zero). The masking ensures that only plant-based ingredients are selected.

Referring back to FIG. 3C, the stacked RNN unwinds to any depth (to include any number of GRU cells 350) and stops or halts at particular depth based on the number of ingredients in the input sequence of ingredients. Outputs from the GRU cells form a sequence of decoded ingredients. The decoded ingredients may be mapped back to human-readable words, using the ingredient mapping tool.

The VAE 302 may be trained by shuffling the ingredients in the input sequence of ingredients. In addition, the VAE 302 may be trained on different existing recipes from the recipe database 110 of FIG. 1. The VAE 302 may be trained such that the loss is minimized according to $$L_{MMD\text{-}VAE}=\mathrm{MMD}(q_\phi(z)\|p(z))+E_{pdata(x)}E_{q\phi(z|x)}[\log_{p\theta}(x|Z)],$$

where $$\mathrm{MMD}(p(z)\|q(z))=E_{p(z),p(z')}[k(z,z')]+E_{q(z),q(z')}[k(z,z')]-2E_{p(z),q(z')}[k(z,z')].$$

MMD is the Maximum Mean Discrepancy which measures the difference in moments of the distributions.

The VAE 302 is generative, allowing for the generation of as many alternative sets of decoded ingredients as needed or desired by application, by sampling points in the latent space R.

Each of FIG. 5A, FIG. 5B, FIG. 5C, and FIG. 5D shows alternative candidate sets of ingredients for a recipe. An actual set of ingredients for the recipe is encoded into a latent space. Latent codes are sampled from the distribution ($r=\mu+\sigma\odot\epsilon$) and decoded to generate candidate sets of ingredients.

In the example of FIG. 5A, the recipe is for peppermint hot cocoa. In FIG. 5A, heading "Actual ingredients" shows a listing of the actual ingredients for peppermint hot cocoa, and headings "Generated ingredients: 0," "Generated ingredients: 1," and "Generated ingredients: 2" show different listings of decoded ingredients to mimic peppermint hot cocoa.

In the example of FIG. 5B, the recipe is for heirloom brown bread. In FIG. 5B, heading "Actual ingredients" shows a listing of the actual ingredients for heirloom brown bread, and headings "Generated ingredients: 0," "Generated ingredients: 1," and "Generated ingredients: 2" show different listings of decoded ingredients to mimic heirloom brown bread.

In the example of FIG. 5C, the recipe is for poppy seed crackers. In FIG. 5C, heading "Actual ingredients" shows a listing of the actual ingredients for crackers, and headings "Generated ingredients: 0," "Generated ingredients: 1," "Generated ingredients: 2," and "Generated ingredients: 3" show different listings of decoded vegan ingredients to mimic crackers. As described above, masked ingredient embeddings that mask out animal-based ingredients, may be used by the β-VAE decoder 302*b*, as illustrated in FIG. 3E, or any alternative decoder. The different listings in FIG. 5C are for vegan crackers.

In the example of FIG. 5D, the recipe is for chicken kebabs. In FIG. 5D, heading "Actual ingredients" shows a listing of the actual ingredients for chicken kebabs, and headings "Generated ingredients: 0," "Generated ingredients: 1," "Generated ingredients: 2," "Generated ingredients: 3," and "Generated ingredients: 4" show different listings of decoded vegan ingredients to mimic chicken kebabs. As described above, masked ingredient embeddings that mask out animal-based ingredients, may be used by the β-VAE decoder 302*b*, as illustrated in FIG. 3E. The different listings in FIG. 5D are for vegan chicken kebabs.

3.3 Quantity Solver

During a solving phase, given a target food item and a candidate set of ingredients, the quantity solver 120 solves the quantity of each decoded ingredient and, thus, generating a formula (set of ingredients and quantity for each ingredient).

Figure 4A:
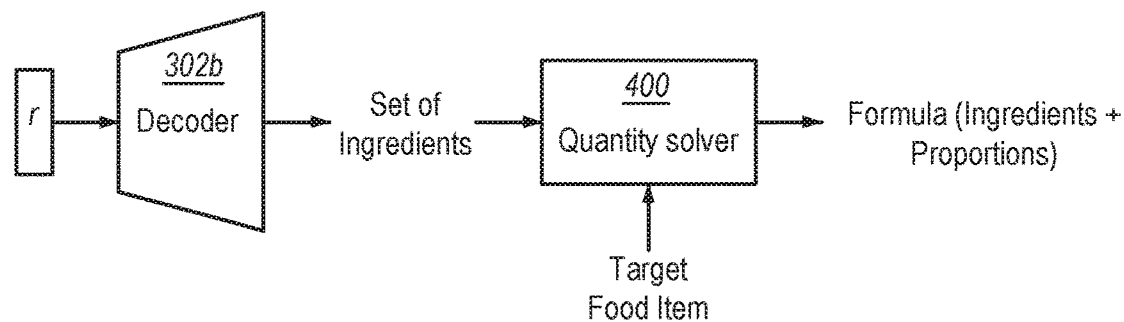
FIGS. 4A, 4B, 4C, 4D illustrate example data flows into and out of a quantity solver in accordance with some embodiments.

FIG. 4A illustrates an example quantity solver 400 in accordance with some embodiments. In an embodiment, the quantity solver 120 of FIG. 1 is similarly configured as the quantity solver 400.

In an embodiment, each ingredient in a candidate set of ingredients (output from the β-VAE decoder 302*b*) may be represented as a USDA ingredient vector $ing\_usda_i$. A target food item may be represented as a USDA target vector (target_usda). The target food item may be an animal target food item (e.g., an animal based brownie). Each vector includes a list of values relating to chemical, nutritional, and/or molecular descriptors or features in the USDA feature space. The set of available ingredients s may be selected by masking out unavailable ingredients (e.g., animal-based) in the ingredient vocabulary embeddings 202*c*.

The quantity solver 400 determines optimal ingredient quantities x using the objective function $$\min[\mathrm{norm}(target\_usda - \Sigma x_i ing\_usda_i)]$$

with the following constraints:

dot(x, s)=1.0
dot(x, ~s)=0.0
x>=0.0.

In other words, the objective function is the mean square difference between the target food item and the linear combination of the ingredients in the formula. The constraints mean that the proportions are nonnegative and that they must sum up to 1.0. The objective function outputs a score indicating how close the formula is to the target food item.

Figure 4B:
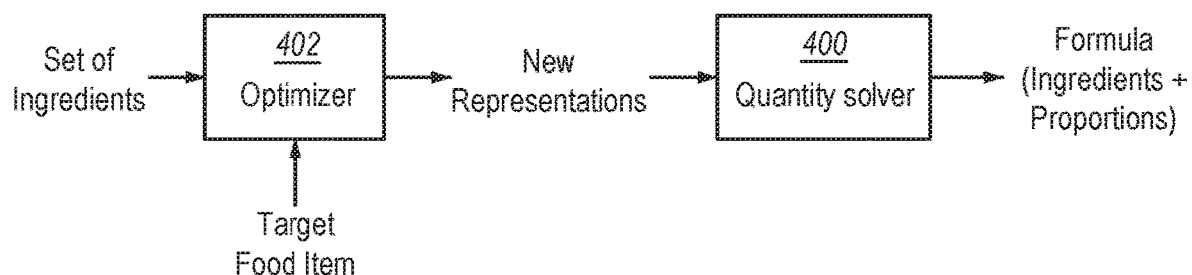

In an embodiment, the formula generator 114 may employ an optional optimizer 402 to determine new representations of the candidate set of ingredients from the β-VAE decoder 302*b* (target_usda) and the target food item (ing_usda) for use by the quantity solver 400, as illustrated in FIG. 4B. The optimizer 124 of FIG. 1 may be similarly configured as the optimizer 402.

The optimizer 402 may use one or more neural networks to learn a representation of knowledge regarding how ingredients are usually combined by training jointly on recipes from the recipes database 110 and target food items. Using this knowledge, the optimizer 402 may generate new representations of the target food item and the ingredients in the candidate set of ingredients. Embodiments of the optimizer 402 are illustrated in FIGS. 4C and 4D.

Figure 4C:
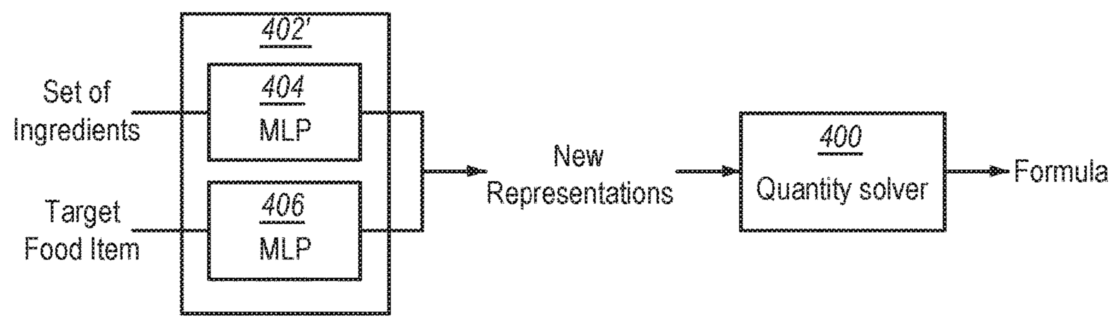

In an embodiment, as illustrated in FIG. 4C, optimizer 402' may use multiple neural networks 404, 406, such as multilayer perceptrons (MLP), for the different inputs (e.g., the candidate set of ingredients and the target food item) as the quantity solver 400 needs to differentiate between the candidate set of ingredients and the target food item to determine proportions. Each of the MLPs 404, 406 determines a new representation of an ingredient or a target food item, based on the knowledge regarding how ingredients are usually combined.

Figure 4D:
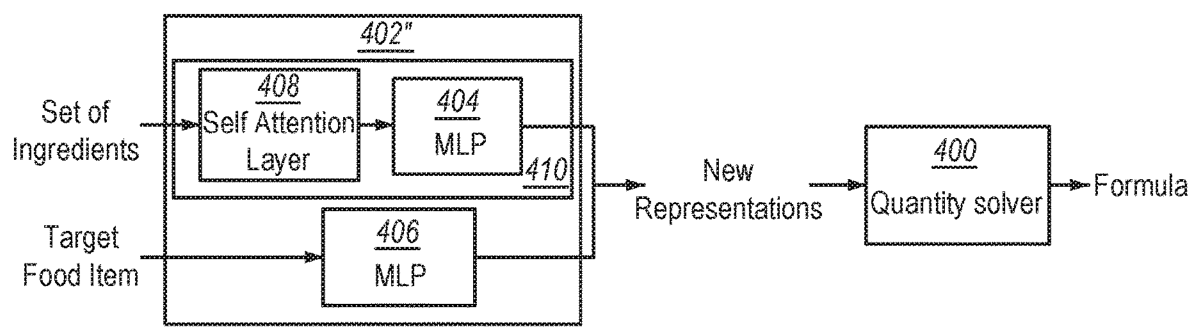

In another embodiment, as illustrated in FIG. 4D, optimizer 402" is similarly configured as the optimizer 402', except that the optimizer 402" includes a self-attention layer 408. The self-attention layer 408 and the MLP 404 are referred to as a transformer encoder 410. The self-attention layer 408 determines a new representation of an ingredient based on other ingredients in the candidate set of ingredients. New representations from the self-attention layer 408 are inputs to the MLP 404. The attention that the self-attention layer 408 provides, helps in considering the neighbor ingredients in the formula, similarly to attention improves context of word sentences in text.

The new representations determined by the optimizer 402, 402', 402" allow for the ingredients to be combined linearly in the quantity solver 400 (since some USDA features do not always combine linearly), such that formulas are generally not dominated by a single ingredient and there are no extreme proportions of ingredients. FIG. 5E shows alternative candidate sets of ingredients for vegan chicken that are generated by the formula generator using the optimizer 402, 402', 402".

3.4 Formula Searcher

During a searching phase, given a target food item and an encoded search space R, the formula searcher 122 of FIG. 1 finds an optimal formula (ingredients and proportions) to reconstruct the target food item in flavor (e.g., taste), feel (e.g., texture), and/or functionality. The formula searcher 122 may implement different searches, including a local search and a global search.

In a local search, the position of the target food item is located in the latent space R. New samples are created near the target food item. In an embodiment, non-plant ingredients are masked out in the ingredient embeddings. New candidate formula(s) is decoded. For example, given an animal target recipe, the ingredients (e.g., {tuna, mayonnaise, chives, onions}) extracted from the animal target recipe are encoded in the latent space R. The space is sampled, and a candidate formula(s) is decoded.

In a global search, a search is performed within the latent space R using a Bayesian optimization technique. In an embodiment, a candidate formula is evaluated using the objective function of the quantity solver. The score f* resulting from the evaluation at the quantity solver alters or shapes the path to follow in the latent space R to generate the next proposed latent code r*. For example, given a formula r1 has a bad score f1, then formulas that are close to r1 will also have a bad score. The more (f, r) pairs there are, the Bayesian optimization will have more accurate representation of the search space R. In an embodiment, rather than using the Bayesian optimization technique, a black box optimization technique or a gradient descent optimization technique may be used. The gradient descent optimization technique may be based on a new differentiable objective.

FIG. 5F and FIG. 5G each shows alternative formulas for a target food item. Latent codes are sampled from a latent space ($r=\mu+\sigma\odot\epsilon$) and decoded to generate candidate sets of ingredients. For each candidate set of ingredients, using the objective function, the quantities for the ingredients in the candidate set are determined and a convex optimization score is generated for the candidate set.

In the example of FIG. 5F, the target food item is stewed chicken meat. FIG. 5F shows different listings of decoded vegan ingredients for stewed chicken meat and respective proportions. Each listing includes a score indicating how close the associated formula (ingredients and proportions) is to the target food item. As described above, masked ingredient embeddings that mask out animal-based ingredients, may be used by the β-VAE decoder 302*b*, as illustrated in FIG. 3E. The different listings are for vegan stewed chicken meat.

In the example of FIG. 5F, the target food item is cured pork. FIG. 5F shows different listings of decoded vegan ingredients for cured pork and respective proportions. Each listing includes a score indicating how close the associated formula (set of ingredients and proportions) is to the target food item. As described above, masked ingredient embeddings that mask out animal-based ingredients, may be used by the β-VAE decoder 302*b*, as illustrated in FIG. 3E. The different listings are for vegan cured pork.

Based on scores of candidate formulas and/or other suitable data, the formula searcher 122 may select an optimal formula. In an embodiment, the optimal formula may be displayed on a client device 104 and/or may be passed as input into a recipe generator to determine cooking directions for the formula.

4.0 PROCEDURAL OVERVIEW

Figure 6:
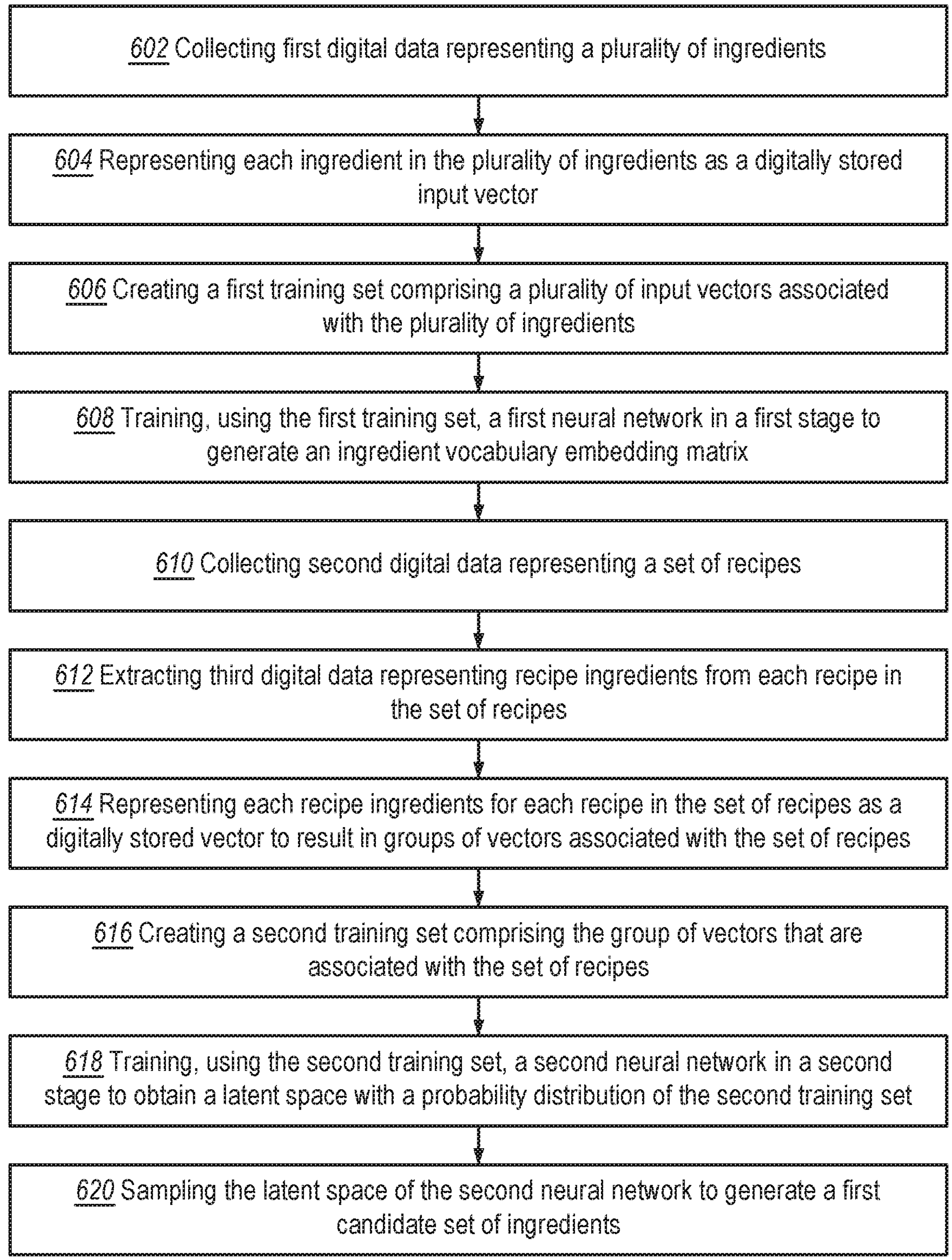
FIG. 6 illustrates an example method to generate a candidate formula in accordance with some embodiments.

FIG. 6 illustrates an example method 600 to generate a candidate formula of a plant-based food item using a set of ingredients to mimic a target food item that is not plant-based, in accordance with some embodiments. FIG. 6 may be used as a basis to code the method 600 as one or more computer programs or other software elements that a formula generator can execute or host.

At step 602, first digital data representing a plurality of ingredients from an ingredients database is collected. Each ingredient in the ingredients database may be associated with a USDA ingredient vector, which may be a list of values relating to chemical, nutritional, and/or molecular descriptors or features. In an embodiment, each ingredient in the ingredients database may also be associated with a BERT embedding that may be trained on recipes in a recipes database. In an embodiment, each ingredient in the ingredients database may also be associated with one or more other vectors representing other features including molecules and flavors.

At step 604, each ingredient in the plurality of ingredients is represented as a digitally stored input vector. Each input vector for a respective ingredient includes at least the USDA ingredient vector for the respective ingredient. In an embodiment, the vector is a concatenation of the USDA ingredient vector with the BERT embedding and/or other feature vectors for the respective ingredient.

At step 606, a first training set for use in training a first neural network is created. The first training set includes a plurality of vectors associated with the plurality of ingredients.

At step 608, the first neural network is trained, using the first training set, in a first stage to generate an ingredient vocabulary embedding matrix. For example, in a representation stage, an autoencoder trains on ingredients to generate ingredient vocabulary embeddings, which are the encoded representations of the ingredients. The ingredient vocabulary embeddings may be represented as a matrix. The ingredient vocabulary embeddings, the encoded representations of the ingredients, and the ingredient vocabulary embedding matrix are stored in digital memory.

At step 610, second digital data representing a set of recipes from a recipes database is collected. Each recipe in the recipes database may be scraped from a website or may be a proprietary recipe. Each recipe may include raw text that includes a list of ingredients, quantity of each ingredient, a state of each ingredient, and directions to describe a list of instructions for cooking the ingredients.

At step 612, third digital data representing recipe ingredients is extracted from each recipe in the set of recipes.

At step 614, each recipe ingredient for each recipe in the set of recipes is represented as a digitally stored vector to result in groups of vectors that are associated with the set of recipes. In an embodiment, each recipe ingredient is represented as a USDA ingredient vector. Each group of vectors is associated with a recipe from the set of recipes.

At step 616, a second training set for use in training a second neural network is created. The second training set includes the groups of vectors that are associated with the set of recipes.

At step 618, the second neural network is trained, using the second training set, in a second stage to obtain a latent space with a probability distribution of the second training set. For example, in a prediction stage, a variational autoencoder trains on sets of ingredients extracted from recipes to determine the latent space. The latent space is stored in digital memory. A latent code may be sampled from the latent space. In an embodiment, the variational autoencoder may include a stacked recurrent neural network (RNN) as a decoder to decode the latent code.

At step 620, the latent space of the second of the second neural network is sampled to generate a first candidate set of ingredients. The first candidate set of ingredients is generated from the latent code by the decoder of the variational autoencoder, based on the ingredient vocabulary embedding matrix of the first neural network.

In an embodiment, prior to generating the first candidate set of ingredients, particular ingredients in the ingredient vocabulary embedding matrix may be masked out to ensure that only non-masked ingredients (e.g., plant-based ingredients) are selected. In this manner, the first candidate set of ingredients are plant-based (e.g., not animal-based).

In an embodiment, based on a target food item, a proportion of each ingredient in the first candidate set of ingredients and a score for the first candidate set of ingredients are determined by a quantity solver during a solving phase. In an embodiment, a new representation of each the first candidate set of ingredients and the target food item may be first generated using an optimizer. The new representations may be used by the quantity solver to determine the proportions and the score.

The variational autoencoder may generate numerous alternative candidate sets of ingredients. Based on the score for the first candidate set of ingredients, the latent space of the second neural network may be resampled to generate a second candidate set of ingredients. Proportions of the ingredients in the second candidate set of ingredients and a score for the second candidate set of ingredients are determined. In an embodiment, a formula searcher may find an optimal formula (ingredients and proportions) from the generated sets to reconstruct the target food item during a searching phase.

In an embodiment, the candidate formula may be generated based on a particular candidate set of ingredients from the latent space of the second neural network and a respective proportion of each ingredient in the particular candidate set of ingredients. The plant-based food item may be prepared or cooked or made by using the candidate formula. In an embodiment, the candidate formula may be the optimal formula found or selected by the formula searcher. The plant-based food item mimics the target food item.

Techniques described herein generate a formula using certain ingredients to mimic a target food item. A space representation of ingredients (e.g., ingredient vocabulary embedding matrix) generated by a first neural network, trained on ingredients, may be used by a second neural network, trained on recipes, to encode and decode a set of ingredients. A latent space of the second neural network may be sampled and decoded in a vegan space by masking ingredients in the ingredient vocabulary embedding matrix that are animal-based, which ensures that only plant-based ingredients are selected.

5.0 HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
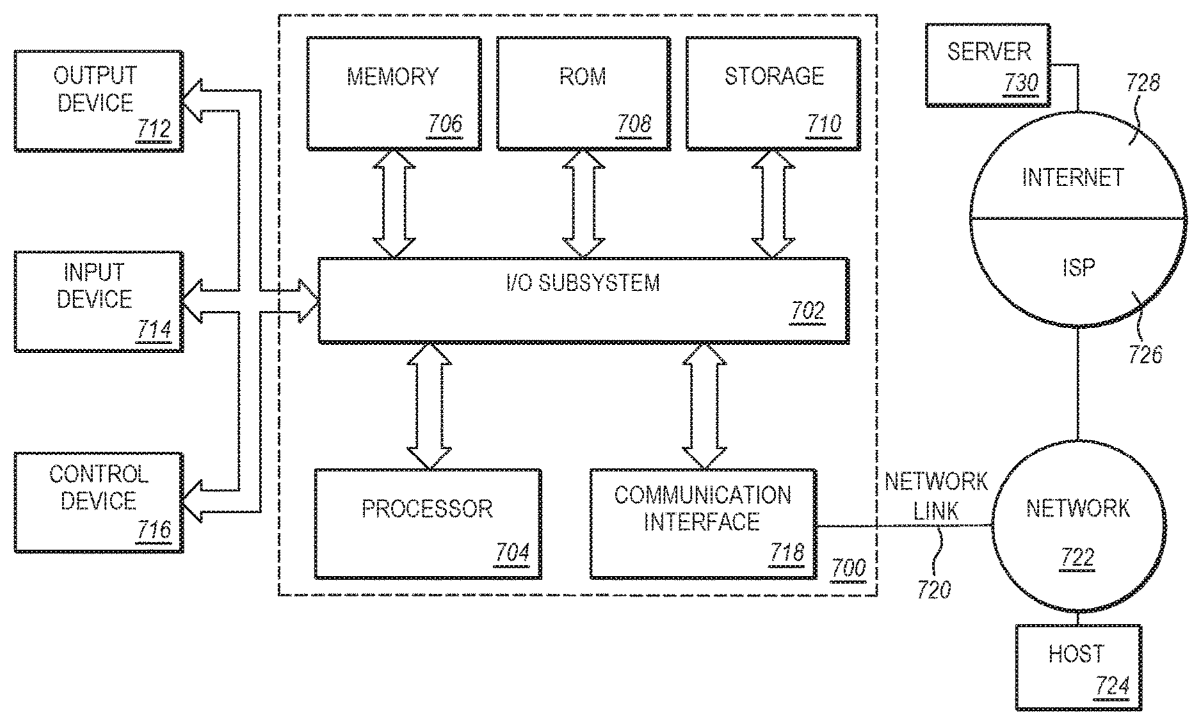
FIG. 7 illustrates a block diagram of a computing device in which the example embodiment(s) of the present invention may be embodiment.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk, or optical disk such as CD-ROM or DVD-ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators, or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork, or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine, or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6.0 SOFTWARE OVERVIEW

Figure 8:
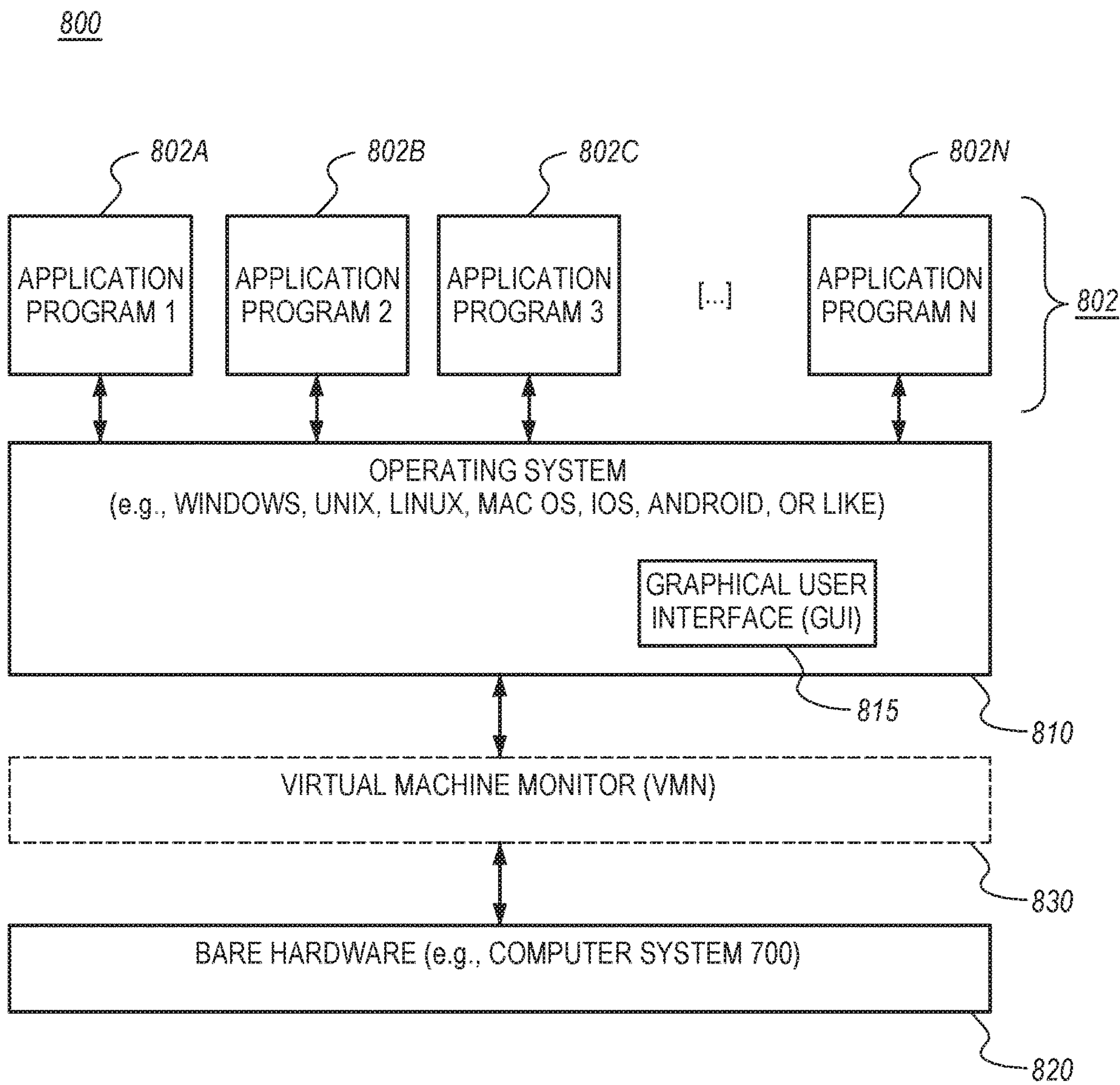
FIG. 8 illustrates a block diagram of a basic software system for controlling the operation of a computing device.

FIG. 8 is a block diagram of a basic software system 800 that may be employed for controlling the operation of computing device 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing device 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on device 800 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of device 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the device 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMI 830 presents the guest operating systems with a virtual operating platform and manages the execution of the guest operating systems.

In some instances, the VMM 830 may allow a guest operating system to run as if it is running on the bare hardware 820 of device 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

7.0 OTHER ASPECTS OF DISCLOSURE

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method to generate a candidate formula of a plant-based food item using a set of ingredients to mimic a target food item that is not plant-based, the method comprising:

collecting first digital data representing a plurality of ingredients from an ingredients database;

representing each ingredient in the plurality of ingredients as a digitally stored input vector;

creating a first training set for use in training a first neural network, the first training set comprising a plurality of input vectors associated with the plurality of ingredients, wherein the first neural network comprises an autoencoder;

training, using the first training set, the first neural network in a first stage to generate an encoded representation of the plurality of ingredients, the encoded representation being stored in digital memory;

collecting second digital data representing a set of recipes from a recipes database;

extracting third digital data representing recipe ingredients from each recipe in the set of recipes;

representing each recipe ingredient for each recipe in the set of recipes as a digitally stored vector to result in groups of vectors that are associated with the set of recipes;

creating a second training set for use in training a second neural network, the second training set comprising the groups of vectors that are associated with the set of recipes, wherein the second neural network comprises a variational autoencoder;

training, using the second training set, the second neural network in a second stage to obtain a latent space with a probability distribution of the second training set, the latent space being stored in digital memory; and sampling the latent space of the second neural network to obtain a latent code to generate a first candidate set of ingredients, wherein the first candidate set of ingredients is generated by decoding the latent code based on the encoded representation of the first neural network.

2. The method of claim 1, wherein each of the plurality of input vectors includes an ingredient vector for a respective ingredient.

3. The method of claim 2, wherein the ingredient vector represents a set of descriptors including at least one chemical descriptor, nutritional descriptor, and molecular descriptor.

4. The method of claim 1, wherein each of the plurality of input vectors is a concatenation of an ingredient vector and a word embedding for a respective ingredient.

5. The method of claim 1, wherein the variational autoencoder includes a stacked recurrent neural network (RNN).

6. The method of claim 1, further comprising, prior to generating the first candidate set of ingredients, masking out particular ingredients in the encoded representation of the plurality of ingredients.

7. The method of claim 1, further comprising, based on the target food item, using a quantity solver, determining a proportion of each ingredient in the first candidate set of ingredients and determining a score for the first candidate set of ingredients.

8. The method of claim 7, further comprising, prior to using the quantity solver, using an optimizer, generating a new representation of each ingredient in the first candidate set of ingredients, wherein the new representation of each ingredient is dependent on the other ingredients in the first candidate set of ingredients.

9. The method of claim 7, further comprising:

based on the score for the first candidate set of ingredients, resampling the latent space of the second neural network to generate a second candidate set of ingredients; and determining a proportion of each ingredient in the second candidate set of ingredients and a score for the second candidate set of ingredients.

10. The method of claim 1, further comprising:

generating the candidate formula based on a particular candidate set of ingredients sampled from the latent space of the second neural network and a respective proportion of each ingredient in the particular candidate set of ingredients;

wherein the plant-based food item is prepared by using the candidate formula.

11. One or more non-transitory computer-readable storage media storing one or more instructions programmed for generating a candidate formula of a plant-based food item using a set of ingredients to mimic a target food item that is not plant-based and which, when executed by one or more computing devices, cause:

collecting first digital data representing a plurality of ingredients from an ingredients database;

representing each ingredient in the plurality of ingredients as a digitally stored input vector;

creating a first training set for use in training a first neural network, the first training set comprising a plurality of input vectors associated with the plurality of ingredients, wherein the first neural network comprises an autoencoder;

training, using the first training set, the first neural network in a first stage to generate an encoded representation of the plurality of ingredients, the encoded representation being stored in digital memory;

collecting second digital data representing a set of recipes from a recipes database;

extracting third digital data representing recipe ingredients from each recipe in the set of recipes;

representing each recipe ingredient for each recipe in the set of recipes as a digitally stored vector to result in groups of vectors that are associated with the set of recipes;

creating a second training set for use in training a second neural network, the second training set comprising the groups of vectors that are associated with the set of recipes, wherein the second neural network comprises a variational autoencoder;

training, using the second training set, the second neural network in a second stage to obtain a latent space with a probability distribution of the second training set, the latent space being stored in digital memory; and sampling the latent space of the second neural network to obtain a latent code to generate a first candidate set of ingredients, wherein the first candidate set of ingredients is generated by decoding the latent code based on the encoded representation of the first neural network.

12. The one or more non-transitory computer-readable storage media of claim 11, wherein each of the plurality of input vectors includes an ingredient vector for a respective ingredient.

13. The one or more non-transitory computer-readable storage media of claim 12, wherein the ingredient vector represents a set of descriptors including at least one chemical descriptor, nutritional descriptor, and molecular descriptor.

14. The one or more non-transitory computer-readable storage media of claim 11, wherein each of the plurality of input vectors is a concatenation of an ingredient vector and a word embedding for a respective ingredient.

15. The one or more non-transitory computer-readable storage media of claim 11, wherein the variational autoencoder includes a stacked recurrent neural network (RNN).

16. The one or more non-transitory computer-readable storage media of claim 11, wherein the one or more instructions, when executed by the one or more computing devices, further cause, prior to generating the first candidate set of ingredients, masking out particular ingredients in the encoded representation of the plurality of ingredients.

17. The one or more non-transitory computer-readable storage media of claim 11, wherein the one or more instructions, when executed by the one or more computing devices, further cause, based on the target food item, using a quantity solver, determining a proportion of each ingredient in the first candidate set of ingredients and determining a score for the first candidate set of ingredients.

18. The one or more non-transitory computer-readable storage media of claim 17, wherein the one or more instructions, when executed by the one or more computing devices, further cause, prior to using the quantity solver, using an optimizer, generating a new representation of each ingredient in the first candidate set of ingredients, wherein the new representation of each ingredient is dependent on the other ingredients in the first candidate set of ingredients.

19. The one or more non-transitory computer-readable storage media of claim 17, wherein the one or more instructions, when executed by the one or more computing devices, further cause:

based on the score for the first candidate set of ingredients, resampling the latent space of the second neural network to generate a second candidate set of ingredients; and determining a proportion of each ingredient in the second candidate set of ingredients and a score for the second candidate set of ingredients.

20. The one or more non-transitory computer-readable storage media of claim 11, wherein the one or more instructions, when executed by the one or more computing devices, further cause generating the candidate formula based on a particular candidate set of ingredients sampled from the latent space of the second neural network and a respective proportion of each ingredient in the particular candidate set of ingredients, and wherein the plant-based food item is prepared by using the candidate formula.

* * * * *